US011988288B2

United States Patent
Parkes et al.

(10) Patent No.: US 11,988,288 B2
(45) Date of Patent: May 21, 2024

(54) POPPET-STYLE VALVE ARRANGEMENTS

(71) Applicant: Swagelok Company, Solon, OH (US)

(72) Inventors: David John Owen Parkes, Port St Mary (IM); Barry Cannell Irvine, Lezayre (IM); Graham Harwood Stephenson, Port Erin (IM); Charles Kneen Bregazzi, Lower Foxdale (IM)

(73) Assignee: SWAGELOK COMPANY, Solon, OH (US)

( * ) Notice: Subject to any disclaimer, the term of this patent is extended or adjusted under 35 U.S.C. 154(b) by 5 days.

(21) Appl. No.: 17/727,920

(22) Filed: Apr. 25, 2022

(65) Prior Publication Data

US 2022/0341496 A1    Oct. 27, 2022

Related U.S. Application Data

(60) Provisional application No. 63/180,166, filed on Apr. 27, 2021.

(51) Int. Cl.
*F16K 1/46* (2006.01)
*F16K 1/42* (2006.01)
*F16K 15/02* (2006.01)

(52) U.S. Cl.
CPC .............. *F16K 1/465* (2013.01); *F16K 1/42* (2013.01); *F16K 15/026* (2013.01)

(58) Field of Classification Search
CPC ........ Y10T 137/7826; Y10T 137/5994; G05D 16/0663
See application file for complete search history.

(56) References Cited

U.S. PATENT DOCUMENTS

| | | | |
|---|---|---|---|
| 3,137,312 A | * | 6/1964 | Hanes ................ G05D 16/0663 |
| | | | 137/505.15 |
| 3,926,204 A | | 12/1975 | Earl |
| 4,693,267 A | | 9/1987 | Patterson |
| 4,781,213 A | | 11/1988 | Kilayko |
| 4,942,899 A | | 7/1990 | Vork |
| 5,749,394 A | | 5/1998 | Boehmer et al. |
| 9,835,256 B2 | | 12/2017 | Bregazzi |
| 2002/0020451 A1 | | 2/2002 | Reid et al. |
| 2006/0043324 A1 | | 3/2006 | Kingsford |
| 2009/0283152 A1 | | 11/2009 | Mason |

(Continued)

FOREIGN PATENT DOCUMENTS

| | | |
|---|---|---|
| DE | 3636739 A1 | 5/1987 |
| DE | 102009003227 A1 | 11/2010 |

(Continued)

OTHER PUBLICATIONS

International Search Report and Written Opinion from PCT/US2022/019431 dated Aug. 18, 2022.

(Continued)

*Primary Examiner* — Reinaldo Sanchez-Medina
*Assistant Examiner* — Nicole Gardner
(74) *Attorney, Agent, or Firm* — Calfee, Halter & Griswold LLP

(57) ABSTRACT

A seat carrier subassembly for a valve includes an annular seat carrier body including an annular projection extending radially into a central passage, and an annular plastic seal ring over-molded onto the annular projection, with the annular plastic seal ring defining a seat seal.

13 Claims, 25 Drawing Sheets

(56) References Cited

U.S. PATENT DOCUMENTS

| | | |
|---|---|---|
| 2010/0025401 A1 | 2/2010 | Jagemann et al. |
| 2015/0369393 A1 | 12/2015 | Pitch et al. |
| 2016/0298772 A1 | 10/2016 | Barton |

FOREIGN PATENT DOCUMENTS

| | | |
|---|---|---|
| EP | 1197691 A2 | 4/2002 |
| EP | 1450083 A1 | 8/2004 |
| GB | 2458921 A | 10/2009 |
| WO | 2016073822 A1 | 5/2016 |
| WO | 2020236853 A1 | 11/2020 |

OTHER PUBLICATIONS

International Search Report and Written Opinion from PCT/US2022/026098 dated Oct. 5, 2022.
Swagelok Company brochure, "Pressure Regulators RHPS Series", 76 pgs. dated Jan. 2016.
Swagelok Company brochure, "Pressure Regulators RHPS Series", 130 pgs., copyright 2019.
Office action from U.S. Appl. No. 17/690,092 dated Dec. 15, 2022.

\* cited by examiner

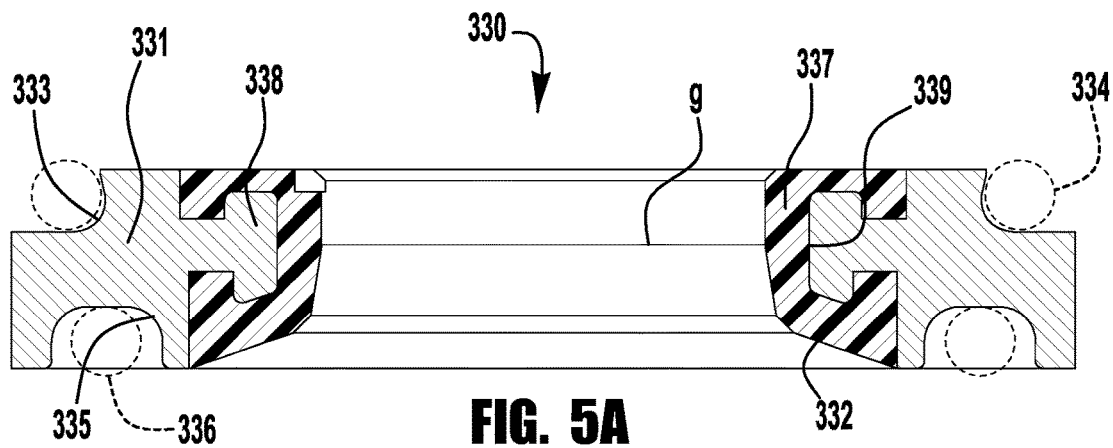
FIG. 5A
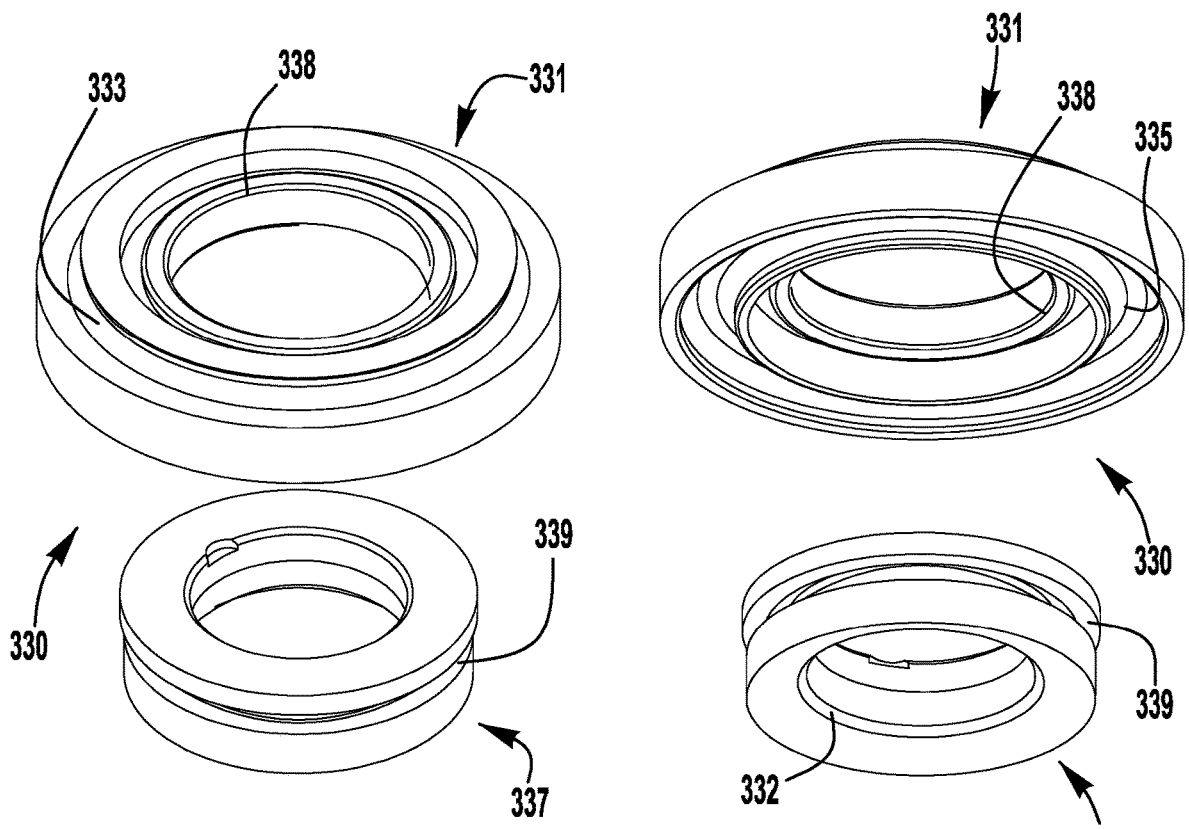
FIG. 5B
FIG. 5C

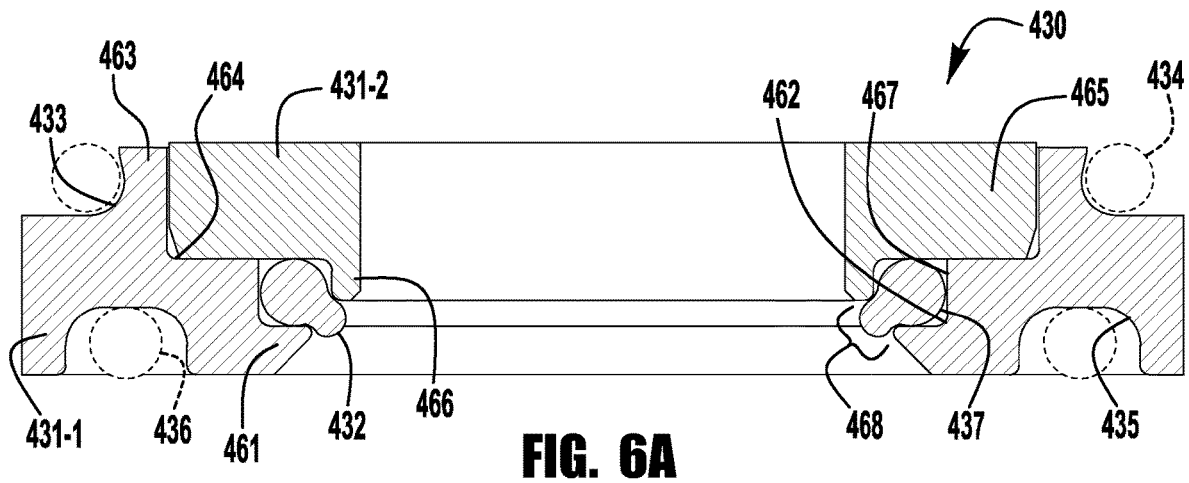
FIG. 6A
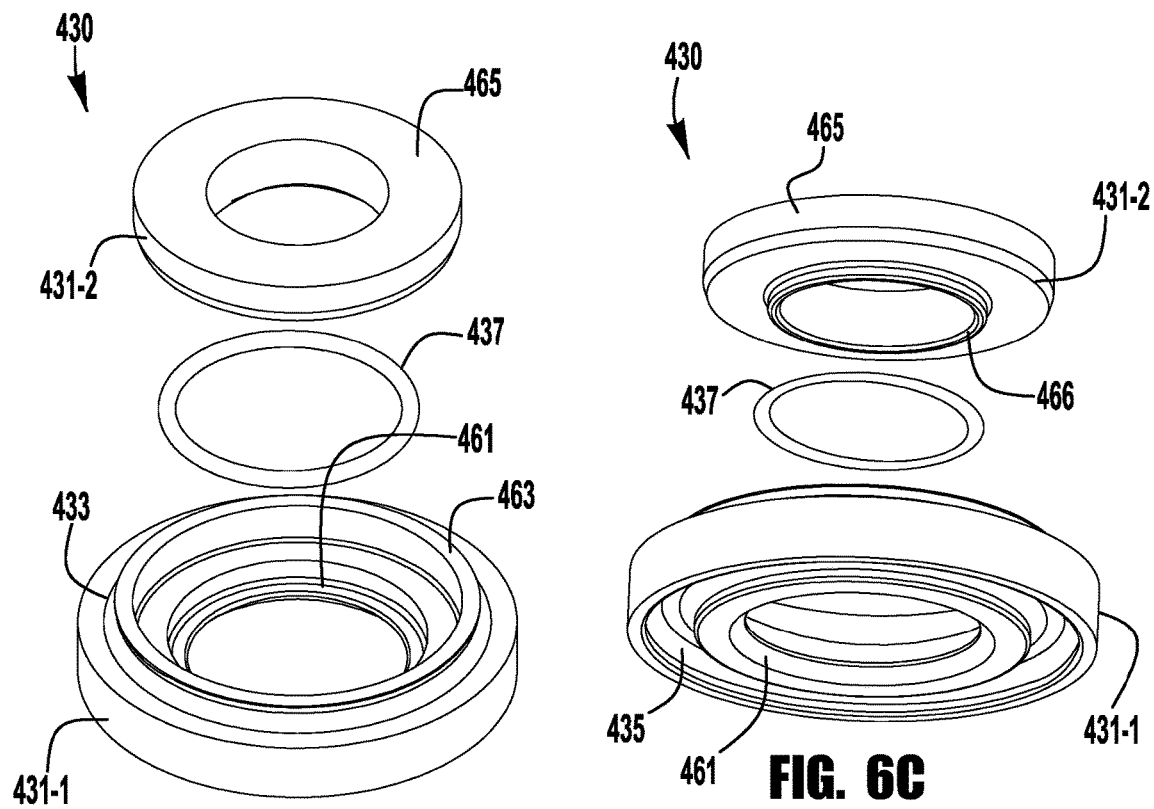
FIG. 6B
FIG. 6C

POPPET-STYLE VALVE ARRANGEMENTS

CROSS-REFERENCE TO RELATED APPLICATION

This application claims priority to and all benefit of U.S. Provisional Patent Application Ser. No. 63/180,166, filed on Apr. 27, 2021, for POPPET-STYLE VALVE ARRANGEMENTS, the entire disclosure of which is incorporated herein by reference.

TECHNICAL FIELD

The inventions relate to fluid flow and delivery devices and methods, and more particularly to poppet valves used to control fluid flow and delivery.

BACKGROUND

Poppet style valves are well known for use as flow control mechanisms for gas and liquid fluid delivery, flow control, and pressure control. Poppet valve arrangements include an axially movable stem having a sealing portion (e.g., enlarged disc, tapered end) that seals against an annular seat in a valve passage when the stem is in a closed position and axially separates from the seat when the stem is in an open position, to permit fluid flow through the valve passage. Many different types of fluid control devices utilize poppet valve mechanisms, including, for example, diaphragm valves, bellows valves, and pressure regulators.

SUMMARY

According to an exemplary embodiment of the present disclosure, a seat carrier subassembly for a valve includes an annular seat carrier body including an annular projection extending radially into a central passage, and an annular plastic seal ring over-molded onto the annular projection, with the annular plastic seal ring defining a seat seal.

According to another exemplary embodiment of the present disclosure, a valve assembly includes a valve body defining a flow path between an inlet port and an outlet port, an annular seal ring surrounding an axially extending portion of the flow path between the inlet port and the outlet port, and a poppet assembled with the valve body and axially movable between a closed position and an open position. The seal ring interlocks with a projection extending radially into the flow path.

According to another exemplary embodiment of the present disclosure, a seat carrier subassembly for a valve includes first and second ring components assembled over an O-ring seal, wherein a portion of the O-ring seal is exposed in an inner diameter gap between inner edge portions of the first and second ring components to define a seat seal.

According to another exemplary embodiment of the present disclosure, a poppet subassembly includes a poppet having a central portion disposed between axially extending upper and lower stem portions, with the central portion defining an upward facing radially extending sealing portion and a downward facing radially extending shoulder portion, a retaining clip secured above an enlarged foot portion of the lower stem portion, and a poppet spring disposed around the lower stem portion and captured between the shoulder portion and the retaining clip.

According to another exemplary embodiment of the present disclosure, a pressure regulator includes a valve body, a poppet disposed within the valve body and including an axially extending upper stem portion and a radially extending poppet sealing portion, a loading mechanism assembled with the valve body and operable to apply a downward load force, and a sensing element disposed between the loading mechanism and the poppet to transmit the load force from the loading mechanism to the poppet. A lower end of the sensing element includes a socket receiving an enlarged head portion of the upper stem portion of the poppet, wherein the socket is sized to permit axial movement of the poppet with respect to the sensing element. The pressure regulator further comprises an overtravel spring disposed around the upper stem portion of the poppet and compressed between a shoulder portion of the poppet and an end face of the socket.

According to another exemplary embodiment of the present disclosure, a pressure regulator includes a valve body module having a valve body housing block retaining a poppet and a seat seal, a loading module having a loading block secured adjacent to the venting adapter block and retaining a loading element configured to apply a load force to a sensing member disposed between the loading element and the poppet, and at least one of: a piston module having a piston adapter block secured between the valve body housing block and the loading block and retaining the sensing member in engagement with the poppet, wherein the sensing member comprises a piston; and a venting module having a venting adapter block secured between the valve body housing block and the loading block and defining a vent port in fluid communication with a vent passage in the sensing member. The valve body housing block and the at least one of the piston adapter block and the venting adapter block each include a uniformly sized first assembly interface, and the loading block and the at least one of the piston adapter block and the venting adapter block each include a uniformly sized second assembly interface in mating and sealing engagement with the first assembly interface of the adjacent one of the valve body housing block and the at least one of the piston adapter block and the venting adapter block, such that the valve body housing block is configured to be assembled directly to the loading block by omitting each of the at least one of the piston module and the venting module.

According to another exemplary embodiment of the present disclosure, a pressure regulator includes a valve body retaining a valve seat, a poppet disposed within the valve body and axially movable with respect to the valve seat, a spring loading mechanism assembled with the valve body and operable to apply a downward load force, and a sensing element disposed between the spring loading mechanism and the poppet to transmit the load force from the spring loading mechanism to the poppet. The spring loading mechanism includes a spring housing, a spring element retained in the spring housing and disposed between an upper force adjusting plate and a lower spring bearing plate, and an adjustment handle assembled with the spring housing and including a threaded stem portion in threaded engagement with the upper force adjusting plate. The upper force adjusting plate is rotationally fixed and axially slideable within the spring housing, such that user rotation of the adjustment handle axially moves the upper force adjusting plate to adjust the downward load force.

BRIEF DESCRIPTION OF THE DRAWINGS

FIG. 5A is a cross-sectional view of a seat carrier subassembly, in accordance with an exemplary embodiment of the present disclosure;

FIG. 5B is an exploded upper perspective view of the seat carrier subassembly of FIG. 5A;

FIG. 5C is an exploded lower perspective view of the seat carrier subassembly of FIG. 5A;

FIG. 6A is a cross-sectional view of a seat carrier subassembly, in accordance with another exemplary embodiment of the present disclosure;

FIG. 6B is an exploded upper perspective view of the seat carrier subassembly of FIG. 6A;

FIG. 6C is an exploded lower perspective view of the seat carrier subassembly of FIG. 6A;

FIG. 19A is an enlarged view of the portion of FIG. 19 labeled 19A;

DESCRIPTION OF EXEMPLARY EMBODIMENTS

Figure 1:
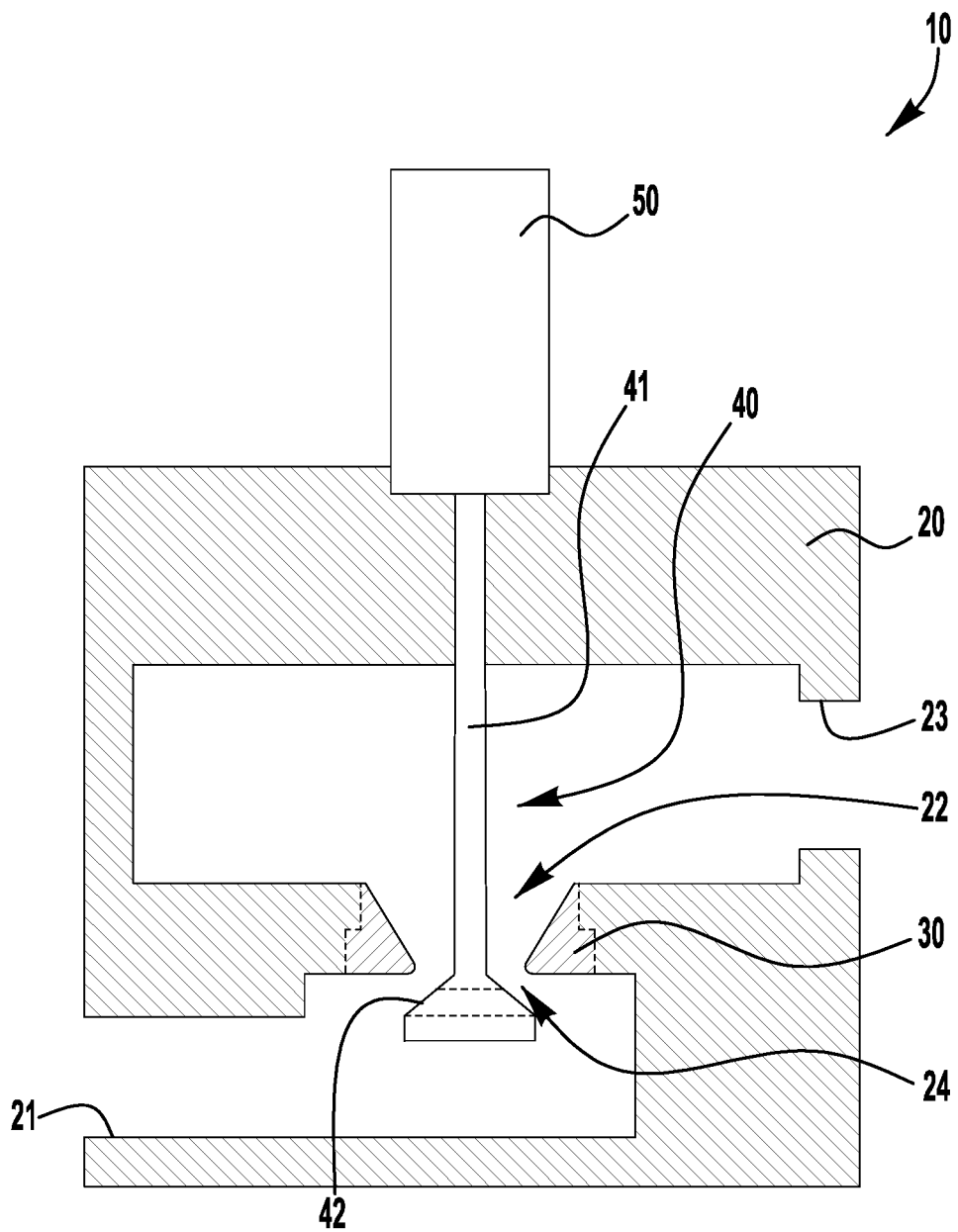
FIG. 1 is a cross-sectional schematic illustration of a poppet type valve assembly.

This Detailed Description merely describes exemplary embodiments and is not intended to limit the scope of the claims in any way. Indeed, the invention as claimed is broader than and unlimited by the exemplary embodiments, and the terms used in the claims have their full ordinary meaning. For example, while the specific embodiments described herein relate to pressure-reducing and back-pressure regulator valve arrangements, the features of the present application may additionally or alternatively be applied to other types of valves, including, for example, user operable regulating valves, shutoff valves, check valves, and relief valves. The terms "poppet valve" and "poppet type valve," as used herein, are intended to broadly include any valve that includes a stem that carries a flow restricting member that is moved relative to an annular seat by longitudinal movement of the stem, and that may, but need not, be movable into sealing engagement with the valve seat. The terms "seal" and "sealing engagement" are intended to include conditions of reduced flow resulting from contact between a sealing surface and a seating surface, in addition to a leak-tight or fluid-tight seal.

While various inventive aspects, concepts and features of the inventions may be described and illustrated herein as embodied in combination in the exemplary embodiments, these various aspects, concepts and features may be used in many alternative embodiments, either individually or in various combinations and sub-combinations thereof. Unless expressly excluded herein all such combinations and sub-combinations are intended to be within the scope of the present inventions. Still further, while various alternative embodiments as to the various aspects, concepts and features of the inventions—such as alternative materials, structures, configurations, methods, circuits, devices and components, software, hardware, control logic, alternatives as to form, fit and function, and so on—may be described herein, such descriptions are not intended to be a complete or exhaustive list of available alternative embodiments, whether presently known or later developed. Those skilled in the art may readily adopt one or more of the inventive aspects, concepts or features into additional embodiments and uses within the scope of the present inventions even if such embodiments are not expressly disclosed herein. Additionally, even though some features, concepts or aspects of the inventions may be described herein as being a preferred arrangement or method, such description is not intended to suggest that such feature is required or necessary unless expressly so stated. Still further, exemplary or representative values and ranges may be included to assist in understanding the present disclosure, however, such values and ranges are not to be construed in a limiting sense and are intended to be critical values or ranges only if so expressly stated. Parameters identified as "approximate" or "about" a specified value are intended to include both the specified value and values within 10% of the specified value, unless expressly stated otherwise. Further, it is to be understood that the drawings accompanying the present application may, but need not, be to scale, and therefore may be understood as teaching various ratios and proportions evident in the drawings. Moreover, while various aspects, features and concepts may be expressly identified herein as being inventive or forming part of an invention, such identification is not intended to be exclusive, but rather there may be inventive aspects, concepts and features that are fully described herein without being expressly identified as such or as part of a specific invention, the inventions instead being set forth in the appended claims. Descriptions of exemplary methods or processes are not limited to inclusion of all steps as being required in all cases, nor is the order that the steps are presented to be construed as required or necessary unless expressly so stated.

With reference to FIG. 1, in a schematically illustrated exemplary embodiment, a poppet type valve assembly 10 includes a valve body 20 defining a valve passage 22 between inlet and outlet ports 21, 23, and an annular valve seat 30 extending around an axially extending central portion 24 of the valve passage. A poppet 40 is assembled with the valve body 20 and includes an axially extending poppet stem 41 and a radially extending poppet sealing portion 42. An actuator or loading mechanism 50 is assembled with the poppet stem 41 to control axial movement of the poppet 40 between a closed position, in which the poppet sealing portion 42 seals against the valve seat 30 (e.g., to prevent flow above an allowable leak rate), and an open position, in which the poppet sealing portion axially separates from the valve seat to permit fluid flow through the axially extending portion 24 of the valve passage 22. The actuator 50 may be user operable (e.g., manually, pneumatically, or electrically operable) for selective movement of the poppet 40. Alternatively, the actuator 50 may be configured to automatically move or permit movement of the poppet under certain predetermined system conditions. For example, an actuator arrangement may be configured to cause or permit automatic movement of the poppet 40 at a threshold system fluid pressure, for example, to relieve excess fluid pressure from a system (in the case of a relief valve), to prevent backflow (in the case of a check valve), or to reduce an outlet pressure (in the case of a pressure regulator). Examples of pressure regulators with poppet type valve arrangements are disclosed in a product catalog titled PRESSURE REGULATORS RHPS SERIES, which is publicly available online and otherwise from Swagelok Company, and is fully incorporated herein by reference.

Figure 2B:
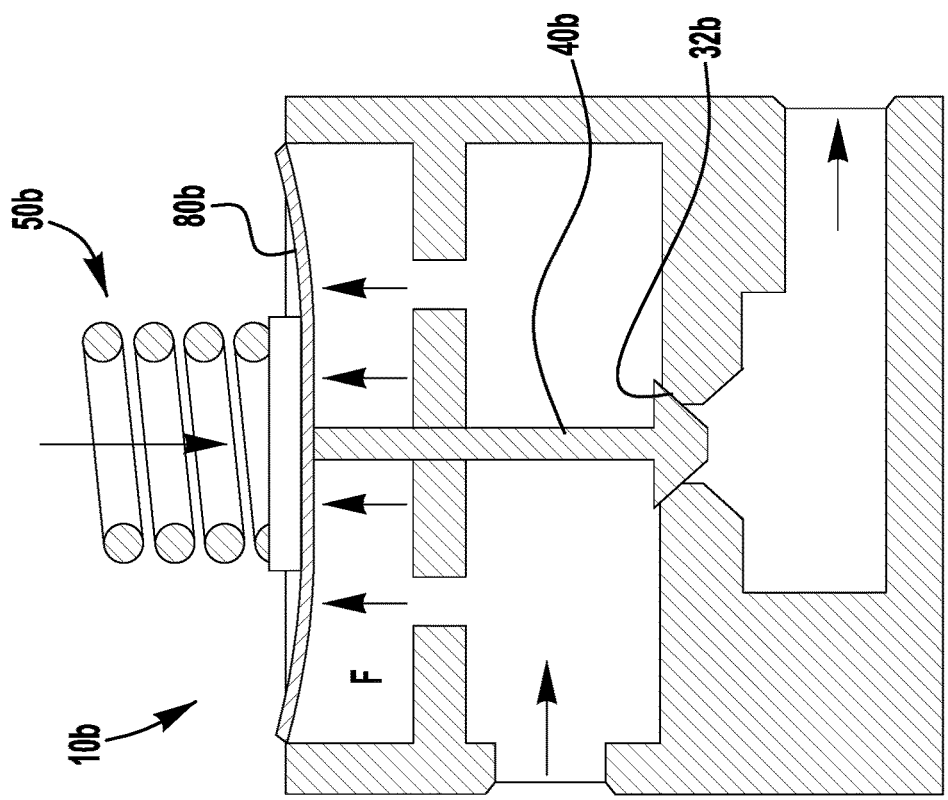
FIG. 2B is a cross-sectional view of a back-pressure regulator valve assembly.
Figure 2A:
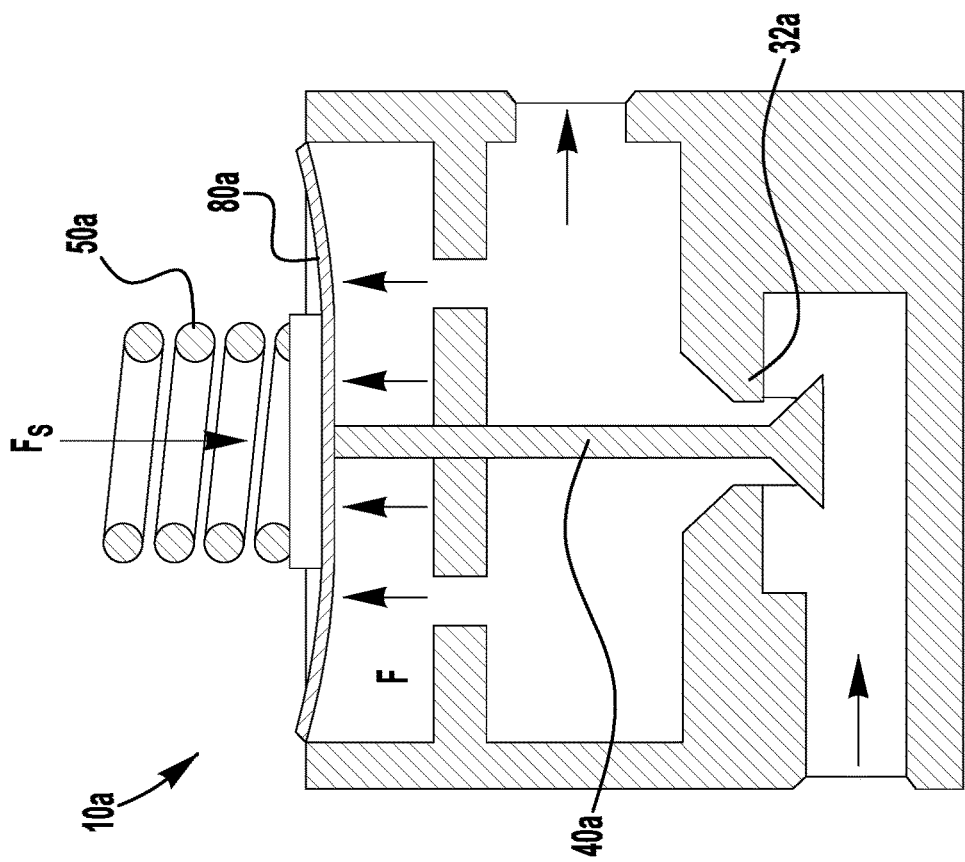
FIG. 2A is a cross-sectional schematic view of a pressure-reducing regulator valve assembly.

FIG. 2A schematically illustrates a pressure-reducing regulator 10a having a regulating mechanism including a sensing element 80a (e.g., a piston or diaphragm) having an upper side subjected to a load force $F_S$ applied by a loading mechanism 50a (e.g., a compressed spring or fluid pressurized chamber) for downward biased movement of the poppet 40a. The lower side of the sensing element 80a is subject to the force F of the system fluid, providing for upward movement of the poppet 40a (e.g., by direct attachment or separately driven movement of the poppet) when the system fluid force F exceeds the biasing element load force $F_S$. The load force $F_S$ biases the poppet 40a toward an open position away from sealing engagement with the valve seat 32a. When the downstream fluid pressure exceeds a desired pressure, corresponding to the system fluid force F exceeding the biasing element load force $F_S$, the sensing element 80a moves upward to provide for upward movement of the poppet toward a closed position with respect to the valve seat 32a, thereby reducing the outlet pressure. When the downstream fluid pressure is reduced to or below the desired pressure, the biasing element load force $F_S$ overcomes the system fluid force F for downward movement of the sensing element 80a to provide for downward movement of the poppet 40a toward the open position.

FIG. 2B schematically illustrates a back-pressure regulator 10b which, similar to the pressure-reducing regulator 10a of FIG. 2A, has a regulating mechanism including a sensing element 80b (e.g., a piston or diaphragm) having an upper side subjected to a load force $F_S$ applied by a loading mechanism 50b (e.g., a compressed spring or fluid pressurized chamber) for downward biased movement of the poppet 40b. The lower side of the sensing element 80b is subject to the force F of the system fluid, providing for upward movement of the poppet 40b when the system fluid force F exceeds the loading mechanism load force $F_S$. The load force $F_S$ biases the poppet 40b toward a closed position in sealing engagement with the valve seat 32b. When the upstream fluid pressure exceeds a desired pressure, corresponding to the system fluid force F exceeding the loading mechanism load force $F_S$, the sensing element 80b moves upward to provide for upward movement of the poppet toward an open position with respect to the valve seat 32b, thereby reducing the inlet or upstream pressure. When the upstream fluid pressure is reduced to or below the desired pressure, the loading mechanism load force $F_S$ overcomes the system fluid force F for downward movement of the sensing element 80b to provide for downward movement of the poppet 40b toward the closed position.

Figure 3:
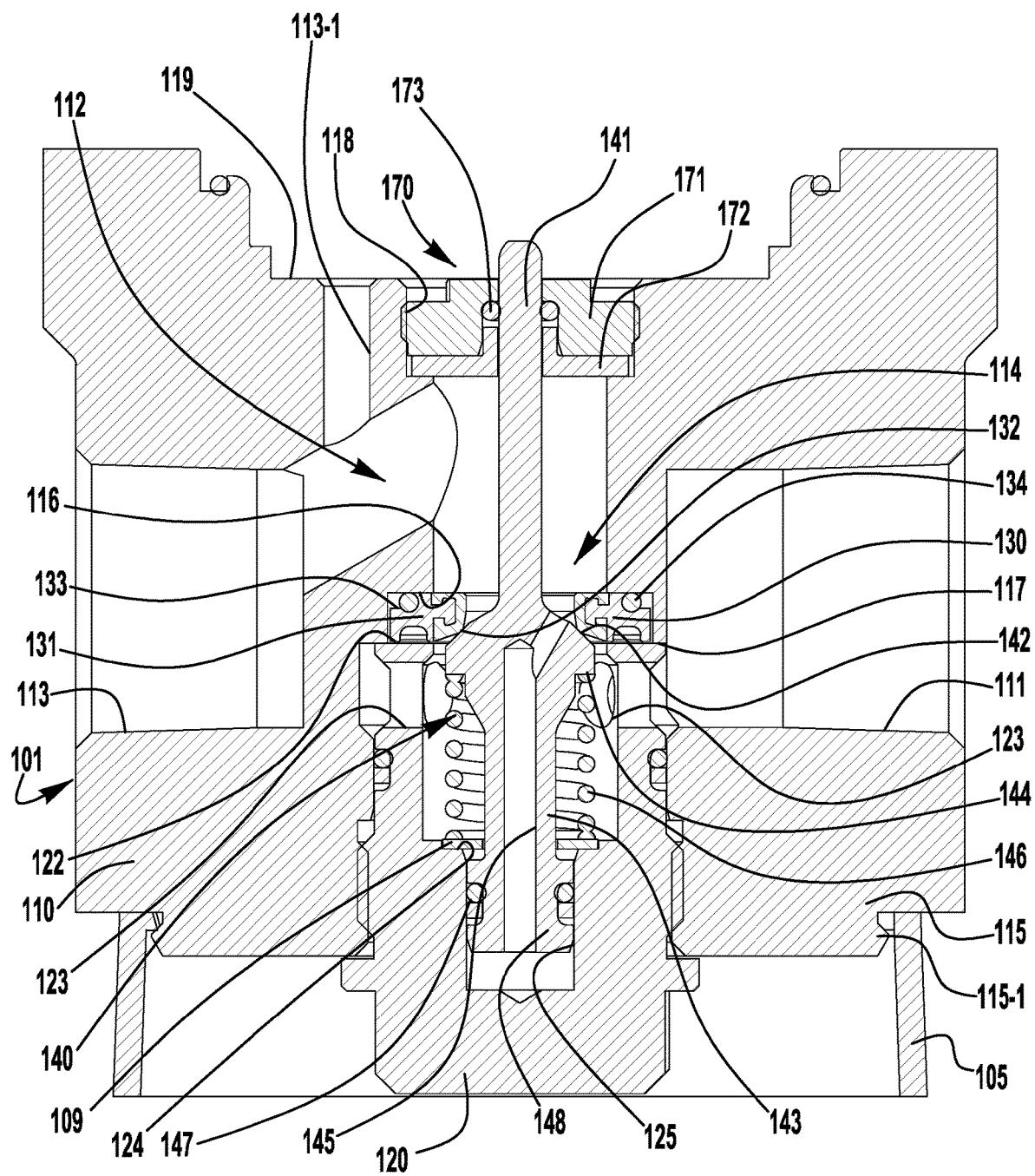
FIG. 3 is a cross-sectional view of a pressure-reducing regulator valve subassembly, in accordance with an exemplary embodiment of the present disclosure.

Many different regulator valve body, poppet, and seat arrangements may be utilized in a variety of combinations. FIG. 3 illustrates an exemplary pressure-reducing regulator valve subassembly 101 including a regulator valve body 110 defining a valve passage 112 between inlet and outlet ports 111, 113, and an annular valve seat seal surface 132 disposed in an axially extending central cavity 114 of the valve body between the inlet and outlet ports. A poppet 140 is assembled with the valve body 110 and includes an axially extending upper poppet stem 141 for engaging (directly or indirectly) the sensing element, and a radially extending poppet sealing portion 142, with the poppet being axially movable between a lower, open position in which the poppet sealing portion is axially spaced from the seat seal surface 132, and an upper, closed position in which the poppet sealing portion is in sealing engagement with the valve seat sealing surface. The outlet port 113 is in fluid communication with a sensing interface chamber 119 at least partially defined by an upper end of the valve body 110. In such an arrangement, a downward force applied to the poppet 140 through the sensing mechanism (described in greater detail below) that exceeds the upward force applied by the outlet fluid pressure moves the poppet toward the lower, open position.

In the illustrated example, the valve body 110 includes a body housing 115 and a body plug 120 assembled (e.g., in threaded engagement) with the central cavity 114 of the housing, and the valve seat seal surface 132 is disposed on a seat carrier 130 retained within the central cavity of the housing.

Figure 7:
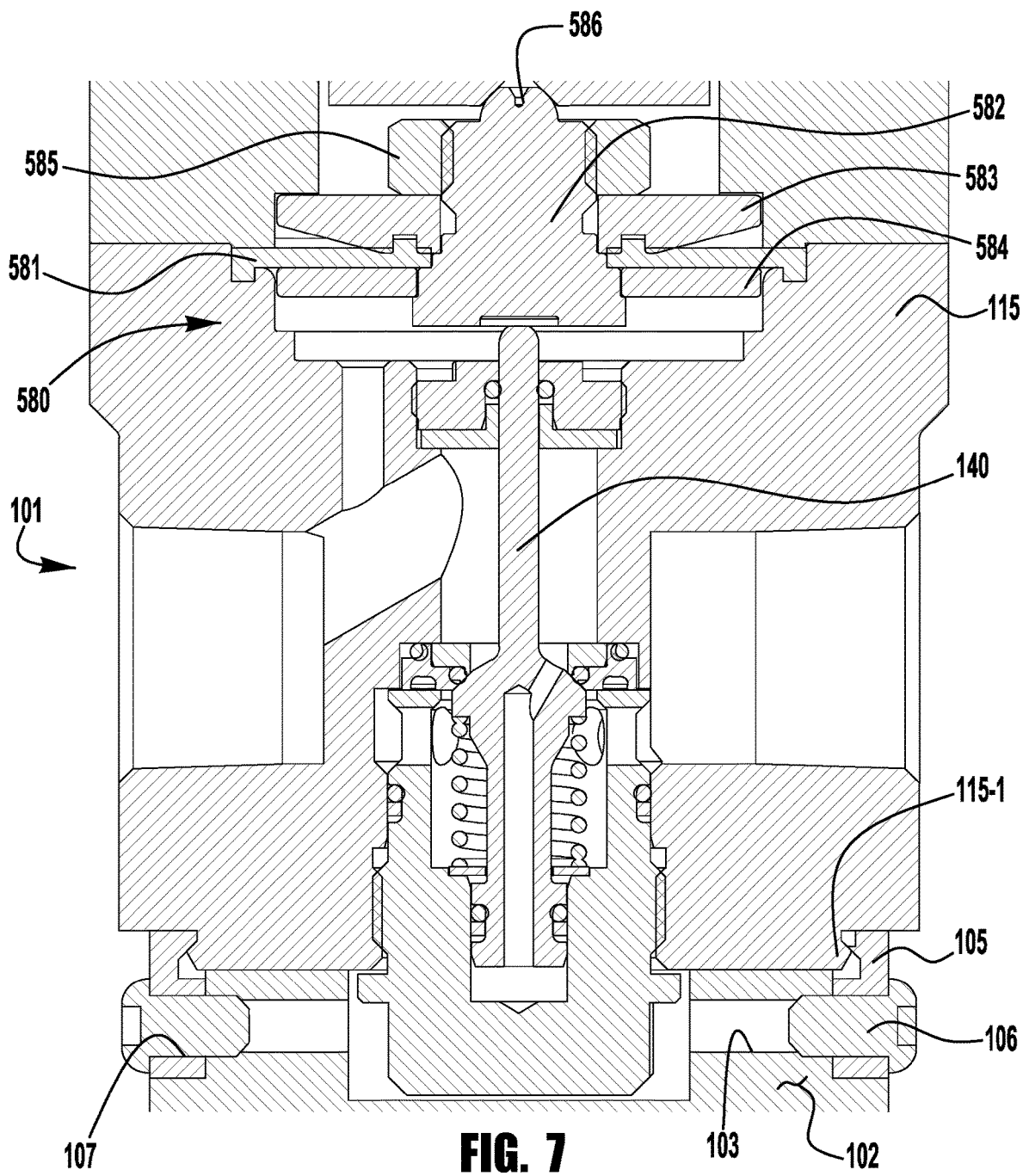
FIG. 7 is a cross-sectional view of a pressure-reducing regulator valve with a diaphragm sensing mechanism, in accordance with another exemplary embodiment of the present disclosure.

As shown in FIG. 3, the body housing 115 may be provided with a support ring 105, sized to support the regulator in an upright position (e.g., on a workbench) prior to installation. The support ring 105 may be provided in a flexible plastic (e.g., nylon) to facilitate snap-on (and snap-off) engagement with a lower lip 115-1 on the body housing 115. Upon installation, the support ring 105 may be removed or retained with the regulator, for example, as a visual indicator (e.g., color code, text or symbols). In other embodiments, the support ring may provide for attachment of additional hardware or devices. For example, as shown in FIG. 7, a heater block 102 (or other fixture block) may be secured to the support ring 105 using threaded fasteners 106 installed through mounting apertures 107 in the support ring and threaded into mounting bores 103 in the heater block 102.

The exemplary body plug 120 includes a central cavity 121 that receives a lower stem portion 143 of the poppet 140, an upper end face 122 that engages the seat carrier 130 to secure the seat carrier against a first counterbore 116 of the central cavity 114, and one or more apertures 123 arranged to align with the valve body inlet port 111, to allow for fluid flow from the inlet port into the body plug cavity 121, and between the poppet sealing portion 142 and the valve seat seal surface 132 to the outlet port 113 when the poppet 140 is in an open position. The apertures 123 may be circumferentially spaced around the body plug 120 to assure alignment of the inlet port 111 with at least one of the apertures, regardless of the rotational position of the body plug in the valve body housing 115. The seat carrier 130 may be provided with an outer annular groove 133 retaining a gasket or O-ring seal 134 for sealing engagement with the first counterbore 116. The body plug end face 122 may be configured to engage a second counterbore 117 in the central cavity 114, for example, to limit axial compression of the seat carrier 130.

As shown, the poppet 140 may be provided with an internal passage 145 extending from the lower stem portion 143 of the poppet to an upper portion of the poppet downstream of the seat seal surface 132, with a gasket seal 147 providing a seal between an enlarged lower foot portion 148 of the poppet lower stem portion and a narrower base portion 125 of the body plug cavity 121, such that when the poppet 140 is in the closed position, the inlet or upstream fluid pressure on the poppet is offset by the outlet or downstream fluid pressure. This arrangement may be referred to as a balanced poppet design, which may, for example, provide for reduced seat load, for example, to reduce wear/deformation of the seat seal surface 132. In such an arrangement, a poppet spring 146 may be provided in the body plug cavity 121, compressed between the body plug 120 and the poppet 140 (e.g., at shoulder 144) to provide a consistent closing/sealing force against the poppet, independent of system fluid pressure.

Figure 3A:
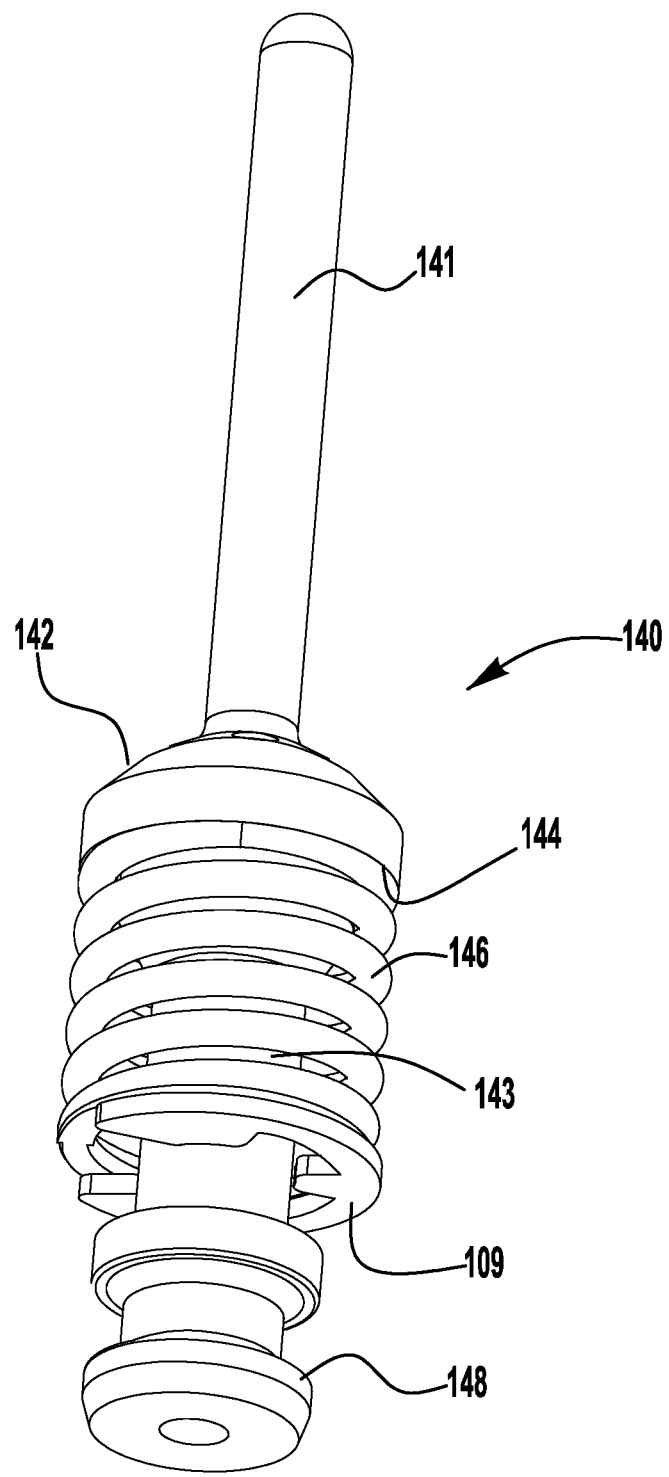
FIG. 3A is a perspective view of the poppet subassembly of the regulator valve subassembly of FIG. 3.

To facilitate assembly of the pressure-reducing regulator valve subassembly 101, the poppet spring 146 may be preassembled with the poppet 140 as a poppet subassembly, for example, in an uncompressed or partially compressed condition, allowing for initial engagement of the body plug threads with the housing threads without having to compress the spring. Once the body plug 120 is partially threaded with the central cavity 114, full threaded installation of the body plug in the central cavity completes the desired compression of the poppet spring 146, with the engagement of the body plug end face 122 against the second counterbore 117 providing a hard stop for the threaded installation. While many different arrangements may be used to provide a poppet with a pre-assembled spring, in the illustrated embodiment, as more clearly shown in FIG. 3A, an e-shaped clip or other such retaining clip 109 is secured above the enlarged foot portion 148 of the lower poppet stem 143, providing a lower bearing surface for the poppet spring 146. The spring 146 may, but need not, be pre-compressed or spring loaded between the poppet shoulder 144 and the retaining clip 109. The body plug cavity 121 may include a shallow annular recess or counterbore 124 sized to receive and align the retaining clip 109.

In an exemplary method, to assemble the seat carrier 130, poppet 140, and body plug 120 with the valve body housing 115, the seat carrier 130 is inserted into the housing through the lower end of the central cavity 114. The poppet 140, with pre-assembled poppet spring 146 is installed in the central cavity 114, with the upper poppet stem 141 extending through the central bore in the seat carrier 130. The body plug is installed over the lower poppet stem 143 and threaded with the valve body housing 115 to secure the seat carrier 130 against the first counterbore 116, with the body plug counterbore 124 engaging the retaining clip 109 to move the retaining clip away from the foot portion 148 of the lower poppet stem 143 and compress the poppet spring 146 to the desired compression.

Figure 4:
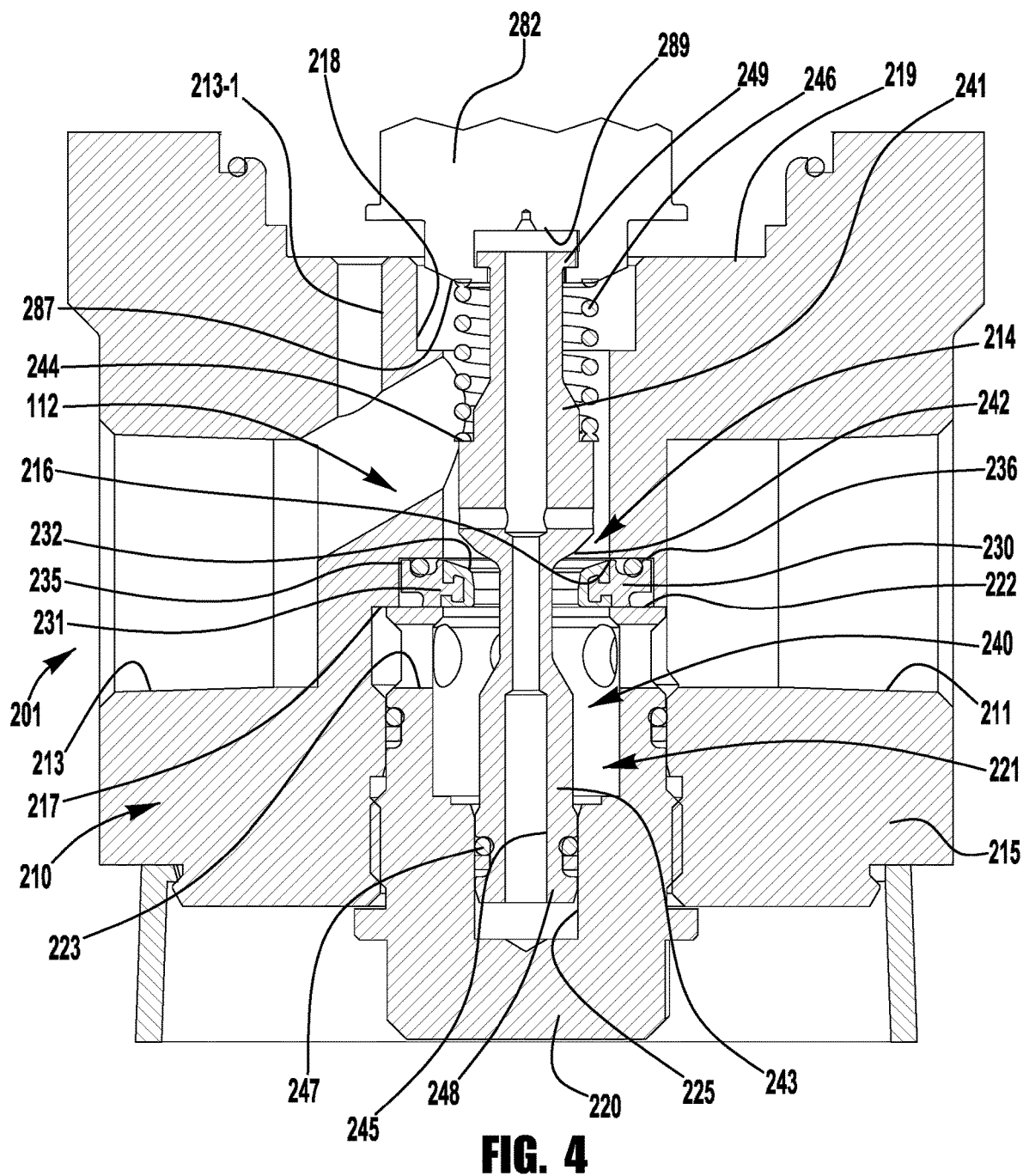
FIG. 4 is a cross-sectional view of a back-pressure regulator valve subassembly, in accordance with an exemplary embodiment of the present disclosure.

FIG. 4 illustrates an exemplary back-pressure regulator valve subassembly 201 including a regulator valve body 210 defining a valve passage 212 between inlet and outlet ports 213, 211, and an annular valve seat seal surface 232 disposed in an axially extending central cavity 214 of the valve body between the inlet and outlet ports. A poppet 240 is assembled with the valve body 210 and includes an axially extending upper poppet stem 241 for engaging (directly or indirectly) the sensing mechanism, and a radially extending poppet sealing portion 242, with the poppet being axially movable between a lower, closed position in which the poppet sealing portion is in sealing engagement with the seat seal surface 232, and an upper, open position in which the poppet sealing portion is axially spaced from the seat seal. The inlet port 213 is in fluid communication with a sensing interface chamber 219 at least partially defined by an upper end of the valve body housing 215. In such an arrangement, a downward force applied to the poppet 240 through the sensing mechanism (described in greater detail below) that exceeds the upward force applied by the inlet fluid pressure moves the poppet toward the lower, closed position.

While a valve body may be provided as a single piece or monolithic component including an integrally formed valve seat, in other embodiments, the valve body may include a multiple component assembly, for example, to facilitate installation and/or replacement of the poppet, the valve seat, or other such components. In the illustrated example, the valve body 210 includes a valve housing 215 and a body plug 220 assembled with (e.g., in threaded engagement) the central cavity 214 of the housing, and the valve seat seal surface 232 is disposed on a seat carrier 230 retained within the central cavity of the housing.

The exemplary body plug 220 includes a central cavity 221 that receives a lower stem portion 243 of the poppet 240, an upper end face 222 that engages the seat carrier 230 to secure the seat carrier against a first counterbore 216 of the central cavity 214, and one or more apertures 223 arranged to align with the valve body outlet port 211, to allow for fluid flow from the inlet port 213, passing between the poppet sealing portion 242 and the valve seat seal surface 232 into the body plug cavity 221, through the aperture(s) 223 to the outlet port 211 when the poppet 240 is in an open position. The apertures 223 may be circumferentially spaced around the body plug 220 to assure alignment of the outlet port 211 with at least one of the apertures, regardless of the rotational position of the body plug in the valve body housing 215. The seat carrier 230 may be provided with an annular end face groove 235 retaining a gasket/O-ring seal 236 for sealing engagement with the first counterbore 216. The body plug end face 222 may be configured to engage a second counterbore 217 in the central cavity 214, for example, to limit axial compression of the seat carrier 230.

As shown, the poppet 240 may be provided with an internal passage 245 extending from the lower stem portion 243 of the poppet to an upper portion of the poppet upstream of the seat seal surface 232, with a gasket seal 247 providing a seal between an enlarged lower foot portion 248 of the poppet lower stem portion and a narrower base portion 225 of the body plug cavity 221, such that when the poppet 240 is in the closed position, the inlet or upstream fluid pressure on the poppet is offset by the outlet or downstream fluid pressure. This arrangement may be referred to as a balanced poppet design, which may, for example, provide for reduced seat load, for example, to reduce wear/deformation of the seat.

In a back-pressure regulator valve subassembly, the seat may further be protected from excessive poppet closing force applied by the sensing mechanism by an overtravel spring, disposed between the sensing mechanism and the poppet sealing portion, allowing for further downward axial travel of the sensing mechanism upon engagement of the poppet sealing portion with the seat seal. According to an exemplary aspect of the present disclosure, a poppet may be interlocked with a bearing member of a sensing mechanism using a joint configured to allow for limited axial movement of the poppet with respect to the sensing mechanism bearing member, with an overtravel spring captured between opposed surfaces of the poppet and the sensing mechanism bearing member. This joint arrangement may facilitate assembly of the poppet with the sensing mechanism.

While many different joint arrangements may be utilized, in an exemplary embodiment, one of the poppet and the bearing member is provided with an enlarged or flanged head portion, and the other of the poppet and the bearing member includes a slotted socket portion that retains the head portion, with an overtravel spring compressed between portions of the poppet and the bearing member, such that the overtravel spring biases the sealing portion of the poppet away from the bearing member. When the load force of the sensing mechanism moves the poppet to the closed position, excess closing forces from the sensing mechanism cause the overtravel spring to be compressed between the poppet and the bearing member, thereby limiting closing forces applied by the poppet to the seat seal.

Figure 4A:
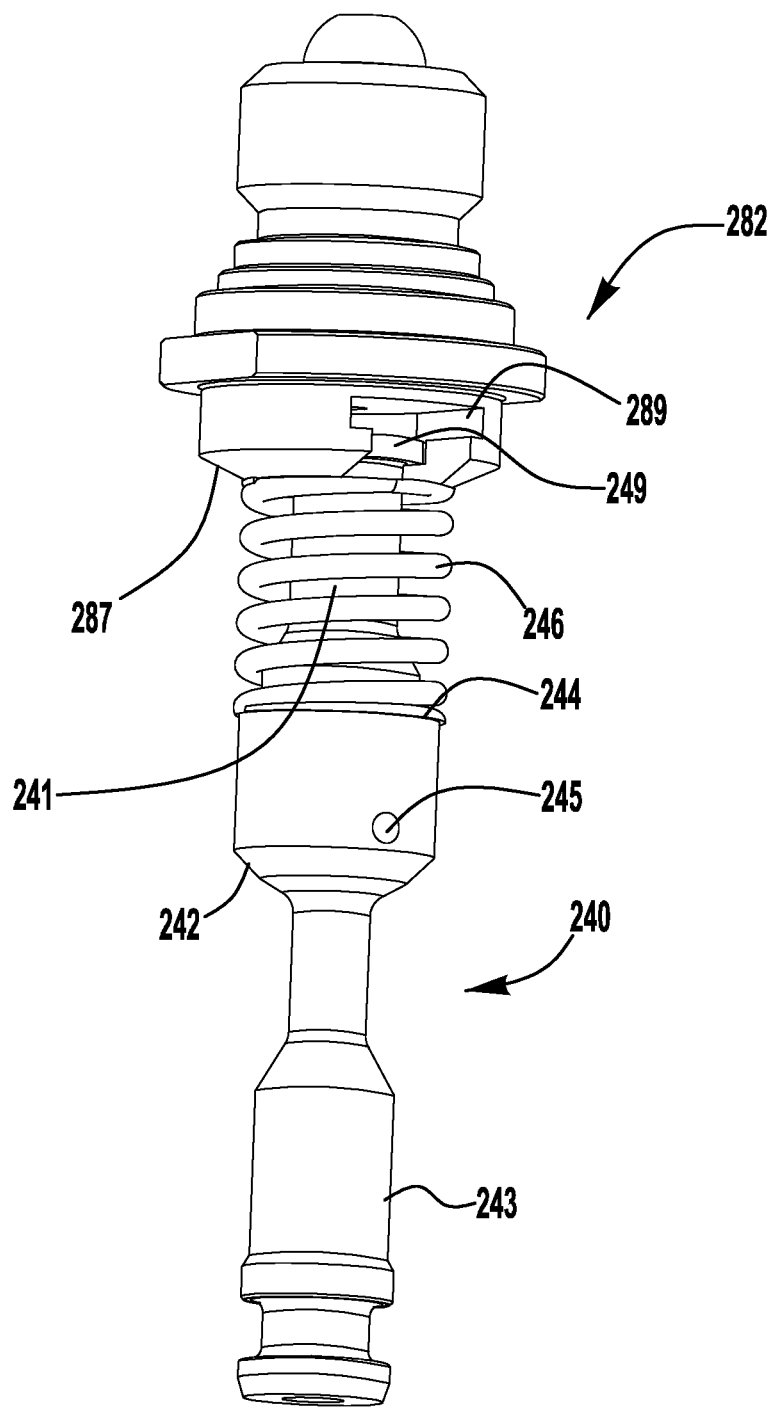
FIG. 4A is a perspective view of the poppet and sensing mechanism bearing member subassembly of the regulator valve subassembly of FIG. 4.

In the illustrated example, as also shown in FIG. 4A, an enlarged or flanged head portion 249 of the poppet 240 is received in a slotted socket portion 289 of the sensing mechanism bearing member 282, and an overtravel spring 246 is compressed between a lower end face 287 of the bearing member and an upper shoulder 244 of the poppet 240, such that the overtravel spring 246 biases the sealing portion 242 of the poppet away from the bearing member. When the load force of the sensing mechanism moves the poppet 240 to the closed position, excess closing forces from the sensing mechanism cause the overtravel spring 246 to be compressed between the poppet and the bearing member 282, thereby limiting closing forces applied by the poppet to the seat seal surface 232.

In an exemplary method, to assemble the seat carrier 230, poppet 240, and body plug 220 with the valve body housing 215 of a back-pressure regulator valve arrangement 201, the overtravel spring 246 is slipped over the upper poppet stem 241, and the head portion 249 of the poppet is inserted into the slotted socket portion 289 of the sensing mechanism bearing member 282, such that the overtravel spring 246 is compressed between the poppet and the bearing member. The poppet 240 is inserted into the housing 215 through the upper end of the central cavity 214, and the seat carrier 230 is inserted into the housing through the lower end of the central cavity 214. The body plug 220 is installed over the lower poppet stem 243 and threaded with the valve body housing 215 to secure the seat carrier 230 against the first counterbore 216.

Many different types of seat carrier assemblies may be utilized, for example, to accommodate different system pressures, temperatures, and fluid/chemical properties. In the exemplary embodiments of FIGS. 3 and 4, the seat carrier 130, 230 includes an annular single piece seat 131, 231 having a contoured inner diameter defining the seat seal surface 132, 232. The seat carrier 130, 230 may be provided in any suitable material, including, for example, plastics such as polytetrafluoroethylene (PTFE), polychlorotrifluoroethylene (PCTFE), and polyetheretherketone (PEEK). In the pressure-reducing regulator valve subassembly 101, the seat carrier includes an outer annular groove 133 retaining a gasket seal 134 for sealing engagement with the first counterbore 116. In the back-pressure regulator valve subassembly 201, the seat carrier 230 includes an annular end face groove 235 retaining a gasket seal 236 for sealing engagement with the first counterbore 216.

In some applications, use of seats and sealing portions of harder materials (e.g., materials having a hardness of at least 90 SHORE D), for example, metals (e.g., stainless steel), for example, in high pressure and/or high temperature applications, may result in greater susceptibility to seat leakage, for example, due to seat-seal misalignment, surface inconsistencies, contamination, or wear. Minor leakage, particularly at high pressures, can cause erosion of the sealing surfaces, leading to more significant leakage past the valve seat. Additionally, in some valve assemblies, a closing force applied to the poppet stem may be minimal, such that forced deflection or deformation of the seat and sealing portions is insufficient to compensate for sealing surface misalignment.

In accordance with an aspect of the present disclosure, a valve seat may be provided as an over-molded, overlaid, or otherwise interlocking annular softer material (e.g., having a hardness less than about 100 HRM) seal ring that is secured to or retained on a harder (e.g., a hardness greater than about 80 HRB) inner circumferential rib, flange, rail, or other such projection protruding into the central portion of the valve passage. The rigid underlying projection allows for the use of a relatively thin (e.g., between about 0.05 and about 0.10 inches) seal ring, thereby minimizing thermal expansion, material flow, and deformation of the softer seal ring material, while providing rigid support to facilitate use in higher pressure (e.g., up to about 6000 psi) applications.

FIGS. 5A, 5B, and 5C illustrate an exemplary annular seat carrier subassembly 330, similar to the seat carriers 130, 230 of FIGS. 3 and 4, including a seat carrier body 331 having an inner peripheral annular projection 338, and an annular seal ring 337 over-molded, overlaid, or otherwise interlocked with the annular projection. The seal ring 337 defines a seat seal surface 332 contoured for sealing engagement with the poppet sealing portion (for example, as shown in FIGS. 3 and 4). While a variety of projections may be utilized, in the illustrated embodiment, the projection 338 is formed as an annular, circumferentially continuous and generally T-shaped rail including a narrower neck portion and an enlarged head portion shaped to be retained in interlocking engagement with a complementary shaped channel portion 339 of the seal ring 337. In other embodiments, the projection may have a different cross-sectional shape, and/or may be circumferentially discontinuous, for example, varying in cross-sectional shape around the circumference, or formed from two or more circumferentially spaced segments.

Similar to the seal rings 130, 230 of FIGS. 3 and 4, the seat carrier 330 may include an first annular groove 333 (e.g., outer annular groove) retaining a gasket seal 334 for sealing engagement with a counterbore in a valve body (e.g., with counterbore 116 in the pressure-reducing regulator valve subassembly 101 of FIG. 4) to provide a downward facing seat seal surface 332, and/or a second annular groove 335 (e.g., annular end face groove 335) retaining a gasket seal 336 for sealing engagement with a counterbore in a valve body (e.g., with counterbore 216 in the back-pressure regulator valve subassembly 201 of FIG. 4) to provide an upward facing seat seal.

While the seal ring may be press fit or otherwise assembled over the projection, in other embodiments, the seal ring 337 may be injection molded or over-molded onto the annular projection 336, which may provide for consistent roundness, surface finish, and material thickness of the seal ring. A variety of injection molding methods may be employed. In an exemplary arrangement, injection molding using diaphragm gating to a non-critical location g of the seal ring inner diameter, spaced apart from the contoured sealing surface 332, may prevent injection molding flow lines and any resulting non-uniform shrinkage and inconsistent roundness of the seal ring.

In still other embodiments, additive manufacturing (e.g., 3D printing) may be utilized to form the seal ring over the underlying projection. Examples of additive manufacturing techniques that may be utilized include, for example: laser powder bed fusion (direct metal laser sintering or "DMLS," selective laser sintering/melting or "SLS/SLM," or layered additive manufacturing or "LAM"), electron beam powder bed fusion (electron beam melting or "EBM"), ultrasonic additive manufacturing ("UAM"), or direct energy deposition (laser powder deposition or "LPD," laser wire deposition or "LWD," laser engineered net-shaping or "LENS," electron beam wire deposition).

Any suitable materials may be used to provide adequate sealing performance within the valve. For example, the seal ring may be provided in suitable plastic (e.g., PEEK), and the seal ring retaining projection may be provided in a metal (e.g., stainless steel). The gasket/O-ring seals may be formed from a suitable elastomer (e.g., ethylene propylene diene monomer (EPDM), perfluoro-elastomer, or nitrile).

In other embodiments (not shown), the seal ring retaining projection may be integrally formed with the valve body (e.g., as a protrusion into the valve body channel), thereby eliminating the separate seat carrier component.

In accordance with another aspect of the present disclosure, a valve seat seal may be defined by an elastomeric gasket or O-ring, for example, to provide effective sealing in lower pressure (e.g., less than about 1000 psi) applications. While an O-ring/gasket seat seal may be carried by the poppet, in other embodiments, a seat carrier arrangement may be configured to securely retain an O-ring gasket seal to provide a seat seal for poppet (e.g., a single piece poppet). In an exemplary embodiment, the seat carrier may include separate first and separate ring components that are assembled (e.g., loosely assembled) over an O-ring seal, with a portion of the O-ring seal being exposed in an inner diameter gap between inner edge portions of the first and second ring components. The limited exposure of the O-ring seal may minimize extrusion, clipping, or other damage to the O-ring during valve actuation.

FIGS. 6A, 6B, and 6C illustrate an exemplary annular seat carrier subassembly 430, similar to the seat carriers 130, 230, 330 of FIGS. 4, 5, and 6A-6B, including first and second ring components 431-1, 431-2 assembled over an O-ring seal 437, with a portion of the O-ring seal being exposed in an inner diameter gap between inner edge portions of the first and second ring components to define a seat seal portion 432. The first and second ring components 431-1, 431-2 may be sized and configured such that when the seat carrier 430 is installed in a regulator valve subassembly (e.g., with the seat carrier secured between a body plug and a counterbore in the valve housing), the first and second ring components compress the O-ring seal 437 to squeeze the seat seal portion 432 of the O-ring seal through the inner diameter gap 468 between the first and second ring components.

In the illustrated embodiment, the first, outer ring component 431-1 includes a radially inward extending flange 461 defining an inner counterbore 462, and an axially upward (in the orientation of FIG. 6A) extending flange 463 defining an outer counterbore 464. The second, inner ring component 431-2 includes an outer peripheral portion 465 that is seated in the outer counterbore 464 of the outer ring component 431-1, and an axially downward extending flange 466 that extends toward the radially inward extending flange 461 of the outer ring component to define an annular cavity 467 for the O-ring seal and the inner diameter gap 468.

Similar to the seal rings 130, 230, 330 of FIGS. 3, 4, and 5A-5C, the seat carrier 430 may include a first annular groove 433 (e.g., outer annular groove) retaining a gasket seal 434 for sealing engagement with a counterbore in a valve body (e.g., with counterbore 116 in the pressure-reducing regulator valve subassembly 101 of FIG. 3) to provide a downward facing seat seal 432, and/or a second annular groove 335 (e.g., annular end face groove) retaining a gasket seal 436 for sealing engagement with a counterbore in a valve body (e.g., with counterbore 216 in the back-pressure regulator valve subassembly 201 of FIG. 4) to provide an upward facing seat seal.

Any suitable materials may be used to provide adequate sealing performance within the valve. For example, the seat carrier ring component(s) may be provided in a metal (e.g., stainless steel) material, and the gasket/O-ring seals may be formed from a suitable elastomer (e.g., EPDM, perfluoroelastomer, or nitrile).

In other embodiments (not shown), one of the first and second ring components may be integrally formed with the valve body, thereby eliminating one of the separate seat carrier components.

According to another aspect of the present disclosure, one or more regulator valve subassembly components may be configured to facilitate modular interchangeability of components in a plurality of regulator assemblies, including, for example: different flow regulating arrangements (e.g., pressure-reducing, back-pressure regulating), different types of seat seals (e.g., hard plastic, soft elastomeric), different loading mechanisms (e.g., spring loading and/or dome loading mechanisms), different regulator sensing mechanisms (e.g., diaphragm sensing mechanism, piston sensing mechanism), and other optional features (e.g., self-venting arrangement).

For example, as shown in FIGS. 3 and 4, a valve body (e.g., valve body housing 115/215 and valve body plug 120/220) may be configured for use with both pressure-reducing and back-pressure style regulators. As shown, a first port 111/211 of the valve body housing 115/215 functions as an inlet port for a pressure-reducing regulator valve (FIG. 3) and an outlet port for a back-pressure regulator valve (FIG. 4), while a second port 113/213 of the valve body housing functions as an outlet port for the pressure-reducing regulator valve and an inlet port for the back-pressure regulator valve. To accommodate the enlarged head-socket joint of the back-pressure regulator valve arrangement (described in greater detail above), the central cavity 114/214 of the valve body housing 115/215 may be provided with an enlarged upper recess 118/218 sized to receive the slotted socket portion 289 and the lower end face 287 of the bearing member 282. To guide the upper poppet stem 141 of the pressure-reducing regulator valve arrangement, a guide ring 170 may be installed in the enlarged upper recess 118/218 to closely receive the upper poppet stem. While many different guide rings may be utilized, in the illustrated embodiment, the guide ring 170 includes first and second annular guide ring elements 171, 172 that capture an O-ring 173 that provides a guiding seal against the upper poppet stem 141. The enlarged upper recess 118/218 and the first guide ring element 171 may include mating threads for threaded retention of the guide ring 170 in the valve body housing 115. As shown, the valve body housing 115/215 may include a bypass channel 113-1/213-1 extending from the second port 113/213 to the sensing interface chamber 119/219 for pressurization of the sensing mechanism in the pressure-reducing regulator valve arrangement.

Using the same valve body housing 115/215 and valve body plug 120/220 for both pressure-reducing and back-pressure regulator arrangements provides a uniform recess, between the first and second counterbores 116/216, 117/217 for retaining the seat carrier for both arrangements. As shown in FIGS. 3, 4, 5A-5C, and 6A-6C, a seat carrier 130/230, 330, 430 may be provided with a first annular groove (e.g., outer annular groove 133/233, 333, 433) and a second annular groove (e.g., end face annular groove 135/235, 335, 435) for use in both pressure-reducing and back-pressure regulator valve arrangements. When the seat carrier 130/230, 330, 430 is installed with the seat seal surface 132, 332, 432 oriented downward for engagement with the poppet sealing portion 142 of a pressure-reducing regulator poppet 140 (FIG. 3), a gasket/O-ring seal 134, 334, 434 is retained in the first annular groove 133/233, 333, 433 for sealing engagement with the first counterbore 116. When the seat carrier 130/230, 330, 430 is installed with the seat seal surface 132, 332, 432 oriented upward for engagement with the poppet sealing portion 242 of a back-pressure regulator poppet 240, a gasket/O-ring seal 136, 336, 436 is retained in the second annular groove 135/235, 335, 435 for sealing engagement with the first counterbore 216 (FIG. 4). In the back-pressure regulator valve subassembly 201, the seat carrier 230 includes an annular end face groove 235 retaining a gasket seal 236 for sealing engagement with the first counterbore 216.

A diaphragm sensing mechanism, used, for example, in lower outlet pressure applications (e.g., spring loading assemblies used with up to about 600 psi outlet pressure) and in applications for which greater accuracy in sensing changes in outlet pressure is desired, may be adapted for use with modular pressure-reducing and back pressure regulating valve arrangements, as described herein.

In the illustrated embodiment of FIG. 7, a diaphragm sensing mechanism 580, shown with the pressure-reducing regulator valve subassembly 101 of FIG. 3, includes a flat, flexible disc of material (e.g., elastomer, plastic, or metal as suitable for the system fluid) forming a diaphragm 581 having an outer periphery clamped or secured between body surfaces (e.g., between opposed surfaces of the valve body housing block 115 and spring or dome loading housing block, tightened by a threaded screw arrangement). As shown, the diaphragm sensing mechanism 580 may include a diaphragm screw or bearing member 582 installed through a central opening in the diaphragm 581 to provide for more robust engagement between the diaphragm and the poppet 140 and loading mechanism (as described below), for example, to protect the diaphragm from damage. In the illustrated example, upper and lower plates 583, 584 are secured to the diaphragm screw 582 on either side of the diaphragm 581 by a nut 585, threaded onto the diaphragm screw, to provide additional support for the diaphragm.

Figure 8:
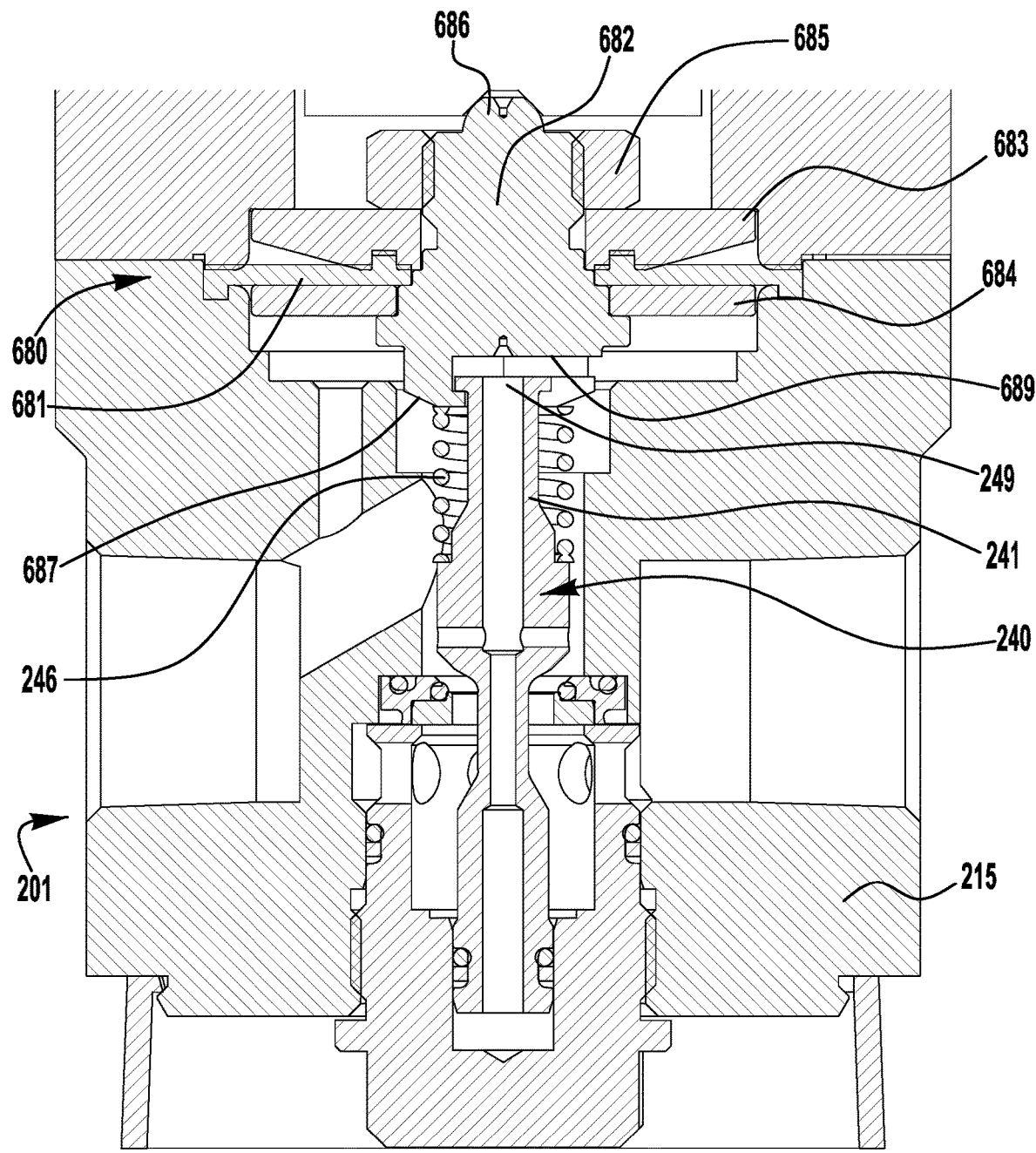
FIG. 8 is a cross-sectional view of a back-pressure regulator valve with a diaphragm sensing mechanism, in accordance with another exemplary embodiment of the present disclosure.

In the illustrated embodiment of FIG. 8, a diaphragm sensing mechanism 680, shown with the back-pressure regulator valve subassembly 201 of FIG. 4, may use the same diaphragm 581/681, upper and lower plates 583/683, 584/684, and nut 585/685 as the diaphragm sensing mechanism 580 of FIG. 7, except with a diaphragm screw or bearing member 682 having a lower portion defining a poppet head retaining socket 689 and overtravel spring engaging end face 687, similar to that shown in FIG. 4 and described above.

A diaphragm sensing mechanism having a larger diaphragm, used, for example, in applications for which still greater accuracy/sensitivity in sensing changes in outlet pressure is desired, may be adapted for use with modular pressure-reducing and back pressure regulating valve arrangements, as described herein.

Figure 9:
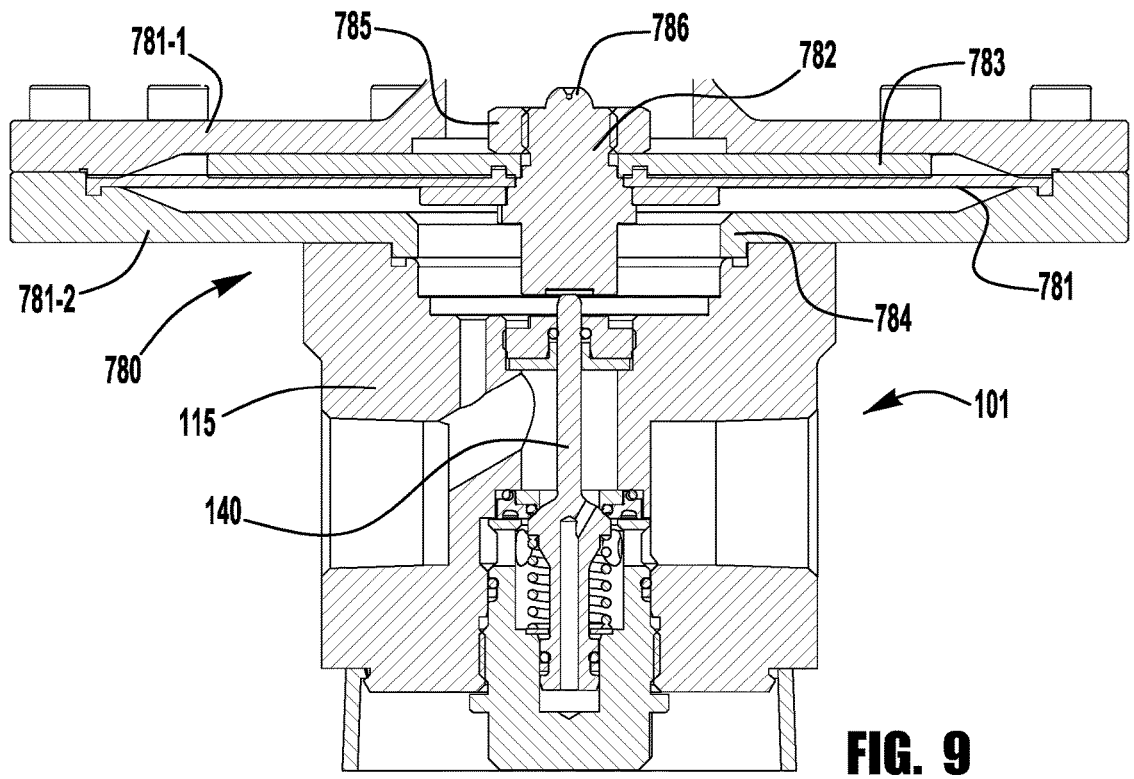
FIG. 9 is a cross-sectional view of a pressure-reducing regulator valve with a high sensitivity diaphragm sensing mechanism, in accordance with another exemplary embodiment of the present disclosure.

In the illustrated embodiment of FIG. 9, a high sensitivity diaphragm sensing mechanism 780, shown with the pressure-reducing regulator valve subassembly 101 of FIG. 3, includes an enlarged diaphragm 781 having an outer periphery clamped or secured between upper and lower diaphragm shell members 781-1, 781-2 which may be secured to each other by a threaded screw arrangement, and bolted onto the valve body housing block 115 (e.g., through mounting holes in the lower diaphragm shell member). As shown, the diaphragm sensing mechanism 780 may include a diaphragm screw or bearing member 782 installed through a central opening in the diaphragm 781 to provide for more robust engagement between the diaphragm and the poppet 140 and loading mechanism (as described below), for example, to protect the diaphragm from damage. In the illustrated example, upper and lower plates 783, 784 are secured to the diaphragm screw 782 on either side of the diaphragm 781 by a nut 785, threaded onto the diaphragm screw, to provide additional support for the diaphragm.

Figure 10:
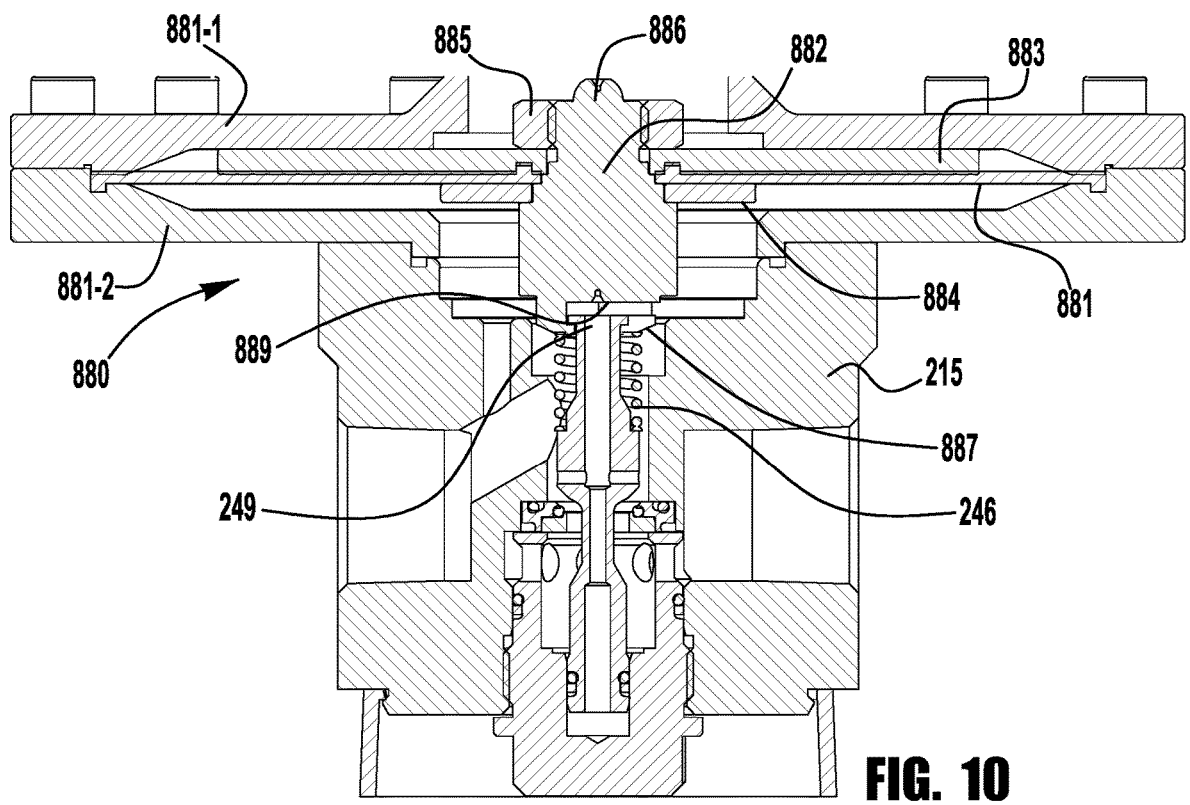
FIG. 10 is a cross-sectional view of a back-pressure regulator valve with a high sensitivity diaphragm sensing mechanism, in accordance with another exemplary embodiment of the present disclosure.

In the illustrated embodiment of FIG. 10, a high sensitivity diaphragm sensing mechanism 880, shown with the back-pressure regulator valve subassembly 201 of FIG. 4, may use the same diaphragm 781/881, upper and lower plates 783/883, 784/884, and nut 785/885 as the diaphragm sensing mechanism 780 of FIG. 9, except with a diaphragm screw or bearing member 882 having a lower portion defining a poppet head retaining socket 889 and overtravel spring engaging end face 887, similar to that shown in FIG. 4 and described above.

A piston sensing mechanism, used, for example, in higher pressure spring loading applications (e.g., about 600 psi) and in applications for which greater resistance to damage caused by pressure spikes is desired, may be adapted for use with modular pressure-reducing and back pressure regulating valve arrangements, as described herein.

Figure 11:
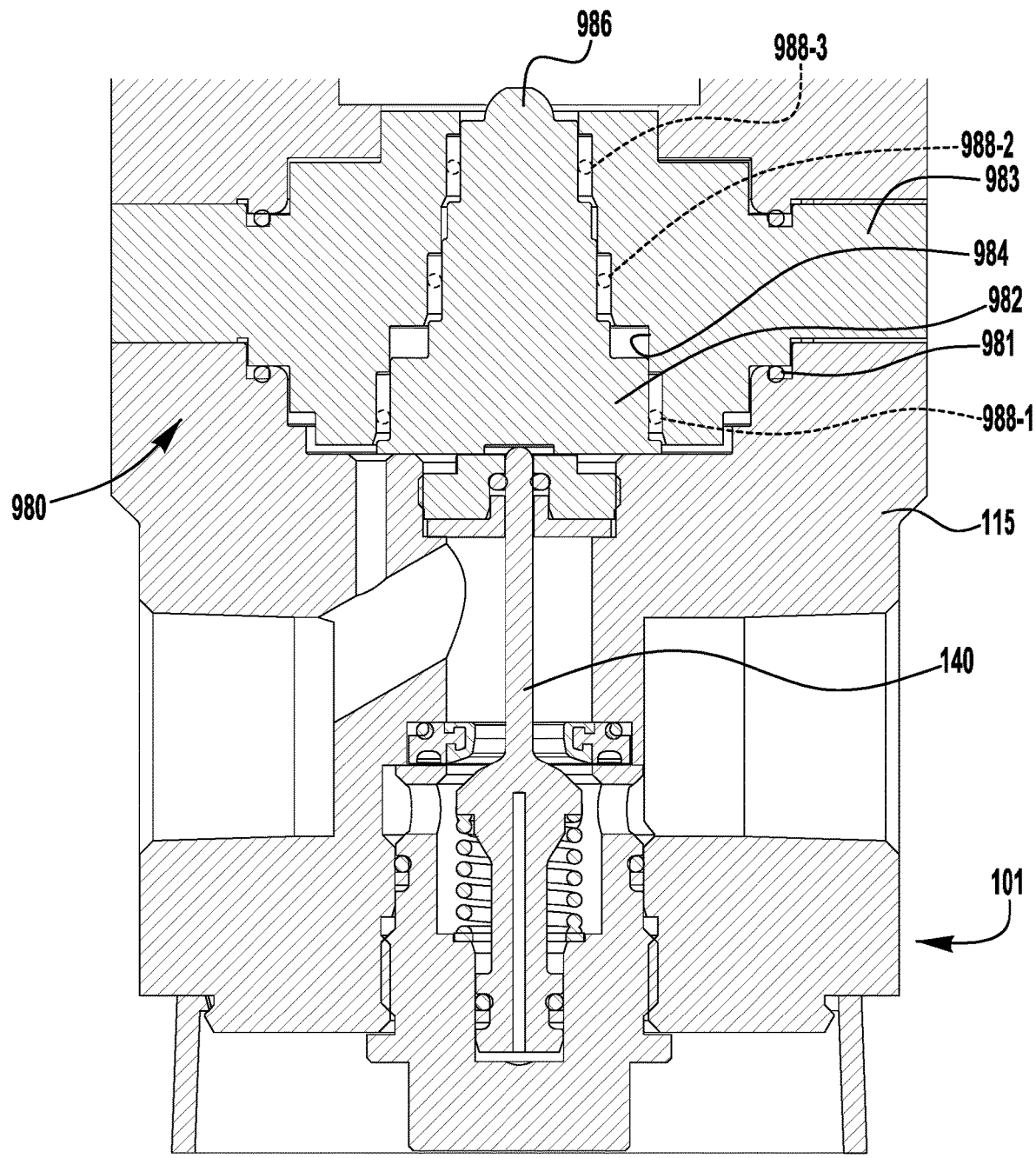
FIG. 11 is a cross-sectional view of a pressure-reducing regulator valve with a piston sensing mechanism, in accordance with another exemplary embodiment of the present disclosure.

In the illustrated embodiment of FIG. 11, a piston sensing mechanism 980, shown with the pressure-reducing regulator valve subassembly 101 of FIG. 3, includes an axially elongated piston member 982 received in a central piston bore 984 of a piston adapter plate or block 983 secured between body surfaces (e.g., between opposed surfaces of the valve body housing block 115 and spring or dome loading housing block, tightened by a threaded screw arrangement). While many different types of sensing piston members may be used, in the illustrated embodiment, the piston member 982 includes a stepped configuration, allowing for adjustment of the fluid driven load applied to the piston by selecting the stepped diameter around which an O-ring seal 988-1, 988-2, 988-3 is provided, to vary the piston upper surface against which the fluid pressure acts. The central piston bore 984 of the piston adapter block 983 is sized and shaped to accommodate this stepped piston configuration. Further, the lower end of the piston adapter block 983 may be shaped to conform with the upper end of the valve housing 115/215, such that the same valve housing may be used with both the diaphragm sensing mechanism 580 and the piston sensing mechanism 980. Additionally, a gasket seal 981 may be provided between the valve body housing block 115 and the piston adapter block 983.

Figure 12:
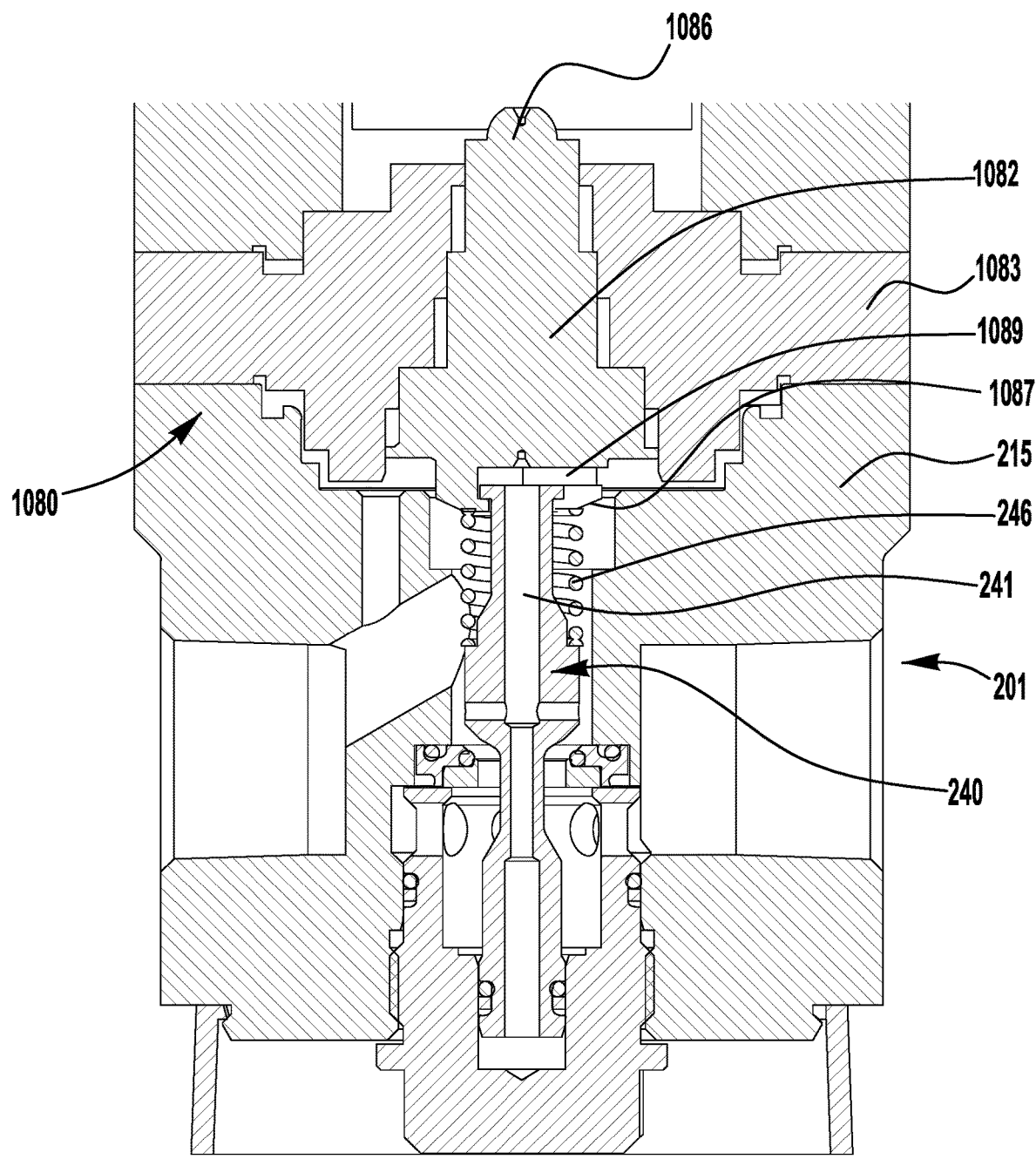
FIG. 12 is a cross-sectional view of a back-pressure regulator valve with a piston sensing mechanism, in accordance with another exemplary embodiment of the present disclosure.

In the illustrated embodiment of FIG. 12, a piston sensing mechanism 1080, shown with the back-pressure regulator valve subassembly 201 of FIG. 4, may use the same piston adapter block 983/1083 as the piston sensing mechanism 980 of FIG. 12, except with a piston member 1082 having a lower portion defining a poppet head retaining socket 1089 and overtravel spring engaging end face 1087, similar to that shown in FIG. 4 and described above.

A spring loading mechanism, used, for example, for manual adjustability of the regulator pressure setting, may be adapted for use with modular pressure-reducing and back pressure regulating valve arrangements, with both diaphragm sensing and piston sensing mechanisms, as described herein.

Figure 13:
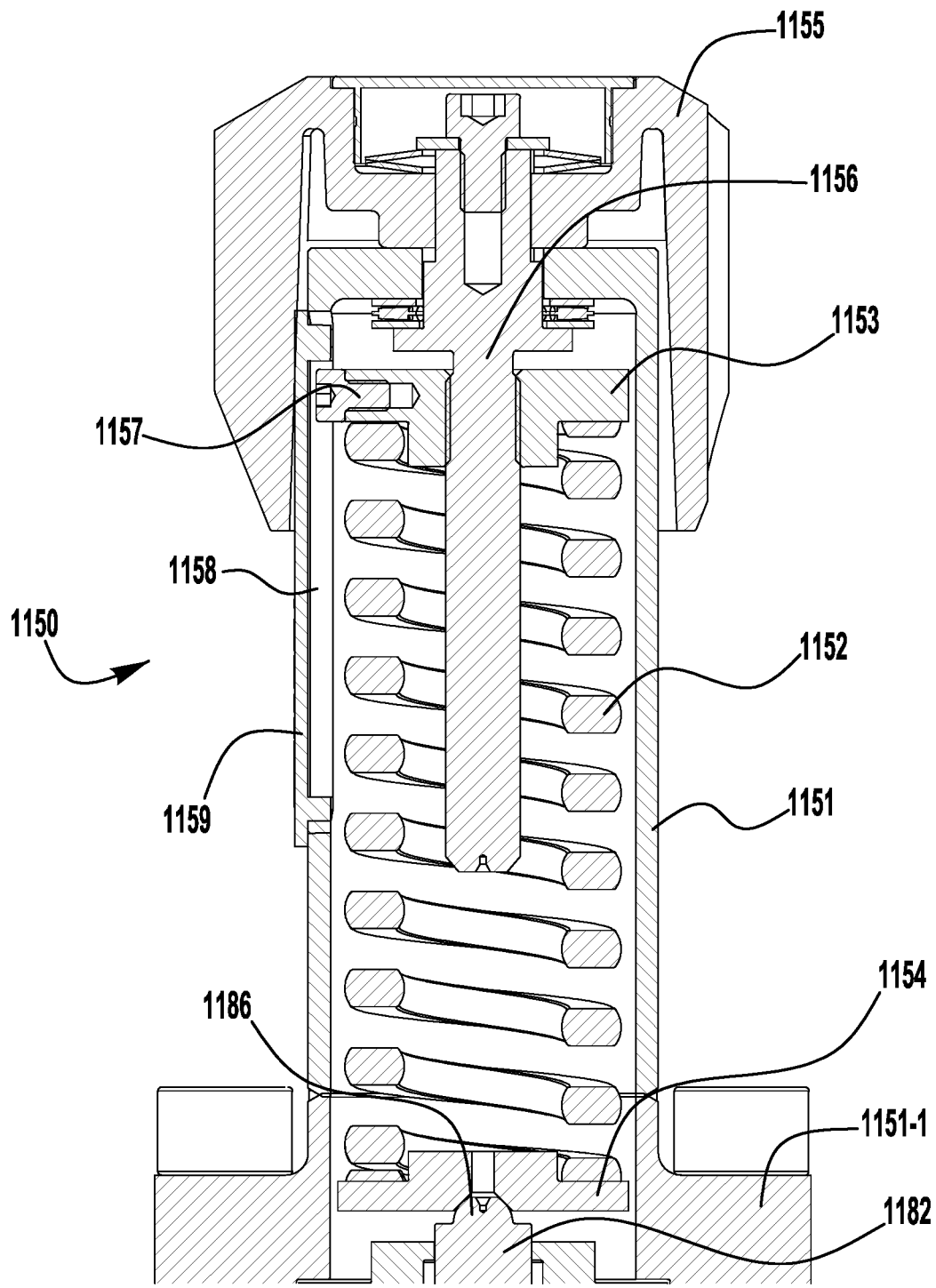
FIG. 13 is a cross-sectional view of a spring loading mechanism for a pressure regulator valve assembly, in accordance with another exemplary embodiment of the present disclosure.
Figure 13A:
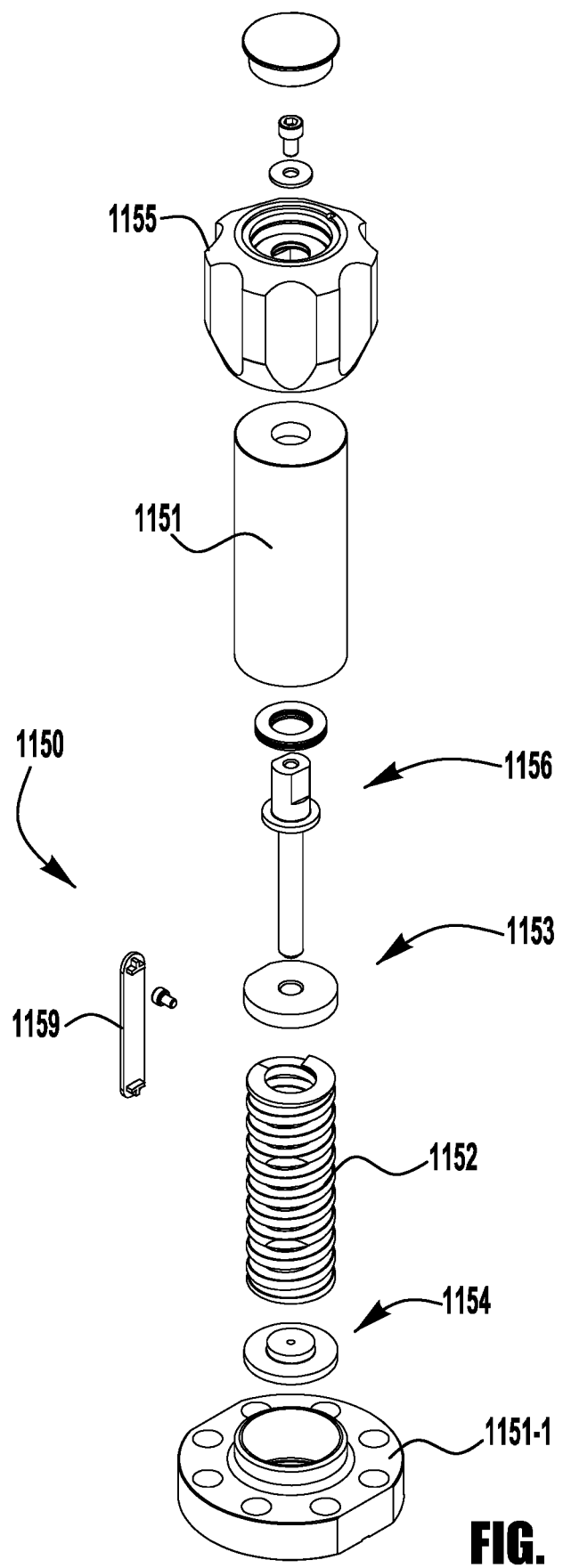
FIG. 13A is an exploded perspective view of the spring loading mechanism of FIG. 13.

In the illustrated embodiment of FIG. 13, a spring loading mechanism 1150 includes an elastically compressible spring element (e.g., one or more coil springs) 1152 retained in a spring housing 1151 assembled with the valve body (e.g., by mounting screws installed through an apertured mounting base 1151-1 of the spring housing), and compressed between an upper force adjusting plate 1153 and a lower spring bearing plate 1154 to apply a load force against the sensing mechanism bearing member 1182 (e.g., piston or diaphragm screw). As shown, the diaphragm screws 582, 682 and piston members 982, 1082 of the modular assemblies described above may include a uniform, load engaging upper end portion 586, 686, 786, 886, 986, 1086, 1186, to accommodate use of the same spring loading mechanism 1150 with any of the modular pressure-reducing and back pressure regulating valve arrangements (with both diaphragm sensing and piston sensing mechanisms) described herein.

The force adjusting plate 1153 may be adjusted (e.g., raised or lowered) to adjust the amount of spring force applied to the sensing mechanism bearing member 1182 through the spring bearing plate 1154. While many different spring adjusting mechanisms may be utilized, in the illustrated example, a knob handle 1155 is assembled with the spring housing 1151 and secured with a threaded stem 1156, such that the handle and threaded stem are rotatable to drive the rotationally fixed force adjusting plate 1153 up and down for adjusting the compression on the spring 1152. The force adjusting plate 1153 is rotationally fixed by a set screw 1157 (or other suitable projection) on the plate, which rides in a vertical slot 1158 in the spring housing 1151, with the slot sized to provide desired upper and lower limits for the force adjusting plate. A cover panel 1159 may installed in the slot 1158, for example, to block debris, moisture or other contaminants.

A diaphragm sensing dome loading arrangement, used, for example, for remote adjustability of the regulator pressure setting, may be adapted for use with modular diaphragm sensing pressure-reducing and back pressure regulating valve arrangements.

Figure 14:
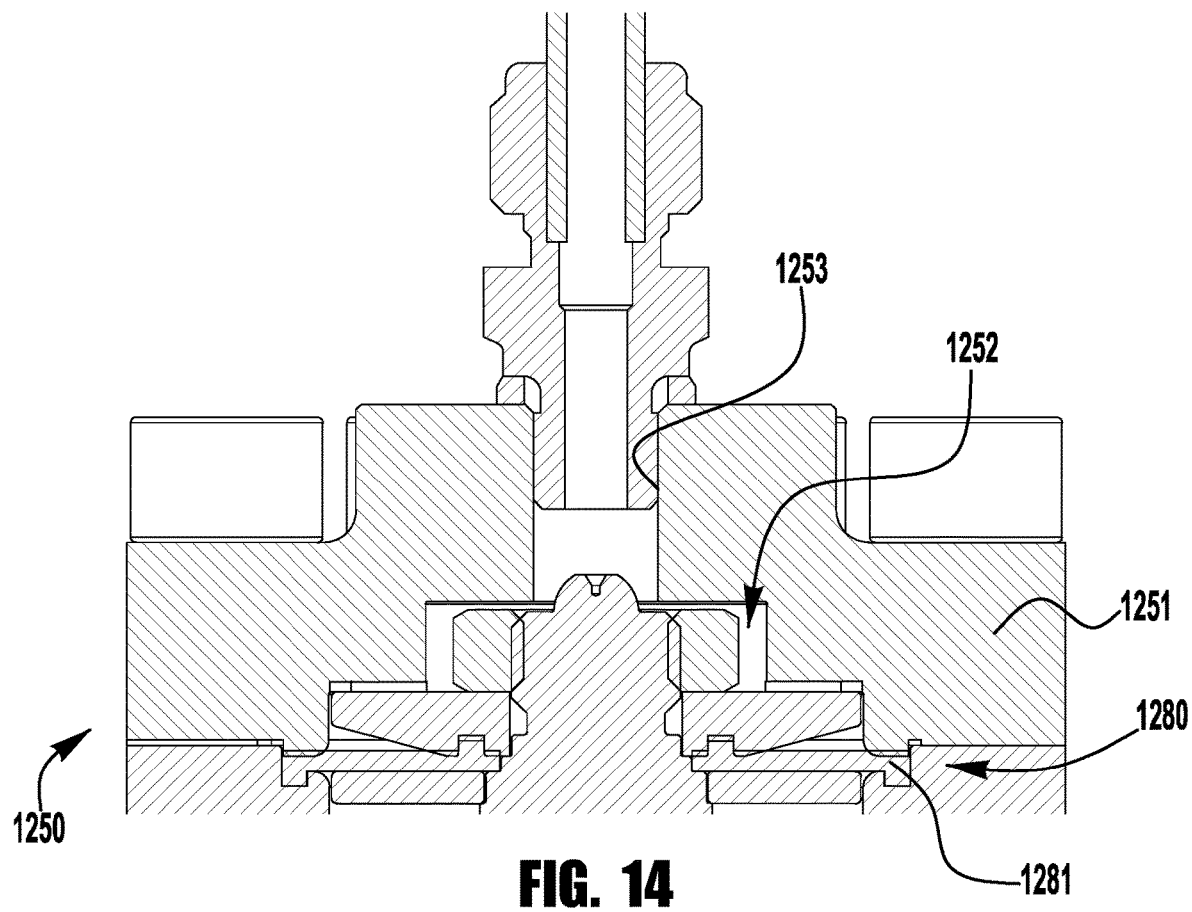
FIG. 14 is a cross-sectional view of a dome loading mechanism for a diaphragm sensing pressure regulator valve assembly, in accordance with another exemplary embodiment of the present disclosure.

In the illustrated embodiment of FIG. 14, a dome loading mechanism 1250 includes a dome housing 1251 assembled with the valve body (e.g., by mounting screws) to define a dome chamber 1252, and including a pressurization port 1253 for supplying a pressurized fluid at a set pressure (e.g., from a secondary pressure regulator) to the dome chamber, to apply a corresponding load force against the diaphragm 1281 of a diaphragm sensing mechanism 1280 (e.g., the pressure-reducing regulator diaphragm sensing mechanism 580 of FIG. 8, or the back-pressure regulator diaphragm sensing mechanism 680 of FIG. 9).

A piston sensing dome loading arrangement, used, for example, for remote adjustability of the regulator pressure setting, may be adapted for use with modular piston sensing pressure-reducing and back pressure regulating valve arrangements.

Figure 15:
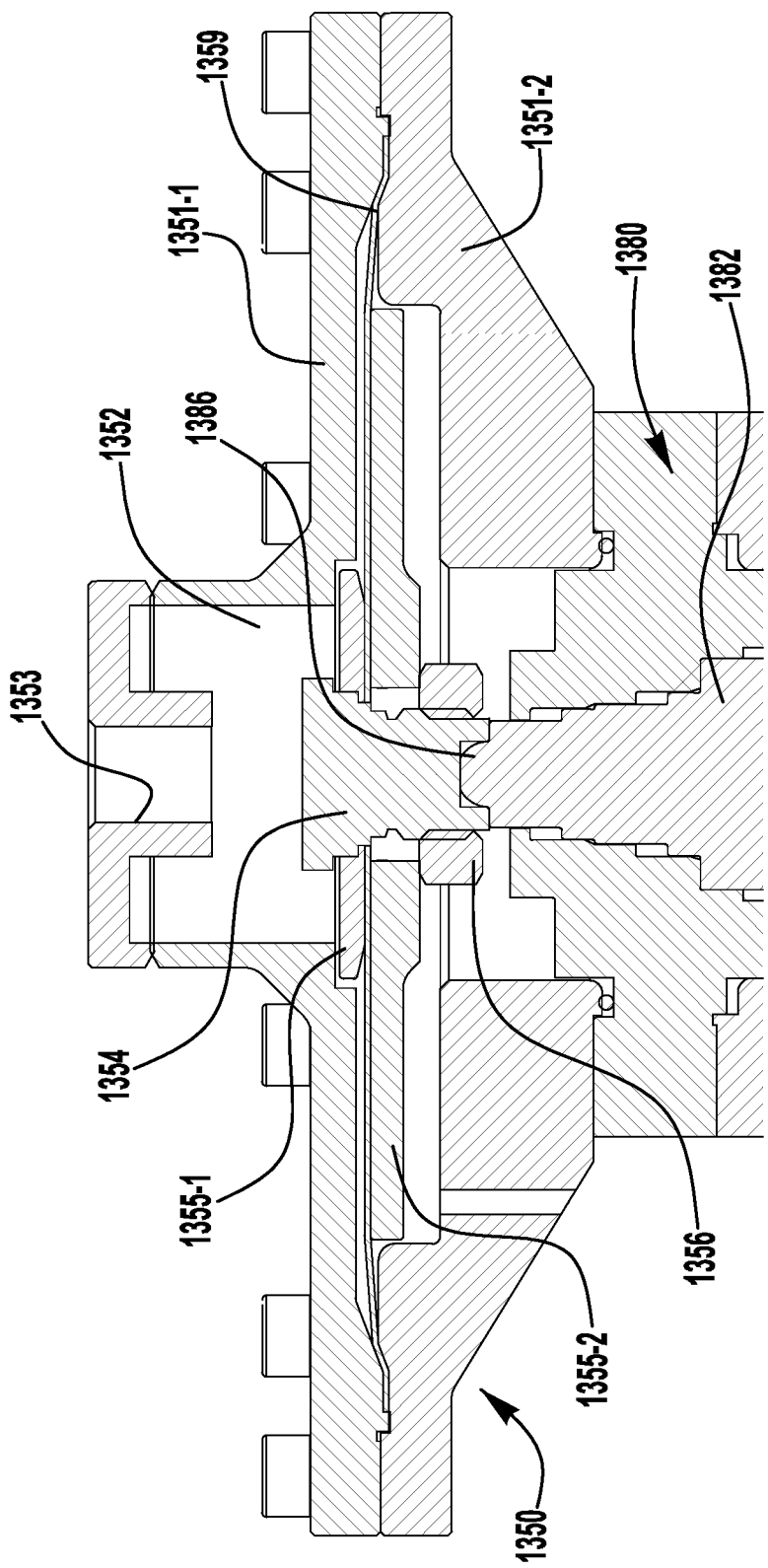
FIG. 15 is a cross-sectional view of a dome loading mechanism for a piston sensing pressure regulator valve assembly, in accordance with another exemplary embodiment of the present disclosure.

In the illustrated embodiment of FIG. 15, a dome loading mechanism 1350 includes upper and lower dome housing shell members 1351-1, 1351-2 assembled with the valve body (e.g., by mounting screws) to define a dome chamber 1352, and a dome loading diaphragm 1359, having an outer periphery captured between the upper and lower shell members, with a diaphragm screw 1354 installed through a central opening in the dome loading diaphragm and positioned to engage the upper end portion 1386 of the sensing element bearing member 1382 (e.g., piston member 982, 1082 of FIGS. 11-12). In the illustrated example, support plates 1355-1, 1355-2 are secured to the diaphragm screw 1354 above and below the dome loading diaphragm 1359 by a nut 1356, to provide additional support for the diaphragm. The upper dome housing shell member 1351-1 includes a pressurization port 1353 for supplying a pressurized fluid at a set pressure (e.g., from a secondary pressure regulator) to the dome chamber, to apply a corresponding load force against the dome loading diaphragm 1359 to move the diaphragm screw 1354 against the piston member 1382 of a piston sensing mechanism 1380 (e.g., the pressure-reducing regulator piston sensing mechanism 980 of FIG. 11, or the back-pressure regulator diaphragm sensing mechanism 1080 of FIG. 12).

A pressure regulator may be provided with a self-vent feature configured to reduce outlet pressure in a pressure-reducing regulator when the regulator set point is decreased and there is no flow through the regulator. The self-vent feature may include a vent passage through the sensing element (e.g., through the diaphragm screw of a diaphragm sensing element, or through the piston member of a piston sensing element) and a vent passage through the regulator valve body. According to an aspect of the present disclosure, a venting adapter block or plate may be assembled with a regulator valve body, in combination with the use of the vented sensing element, to provide this self-vent feature.

Figure 16:
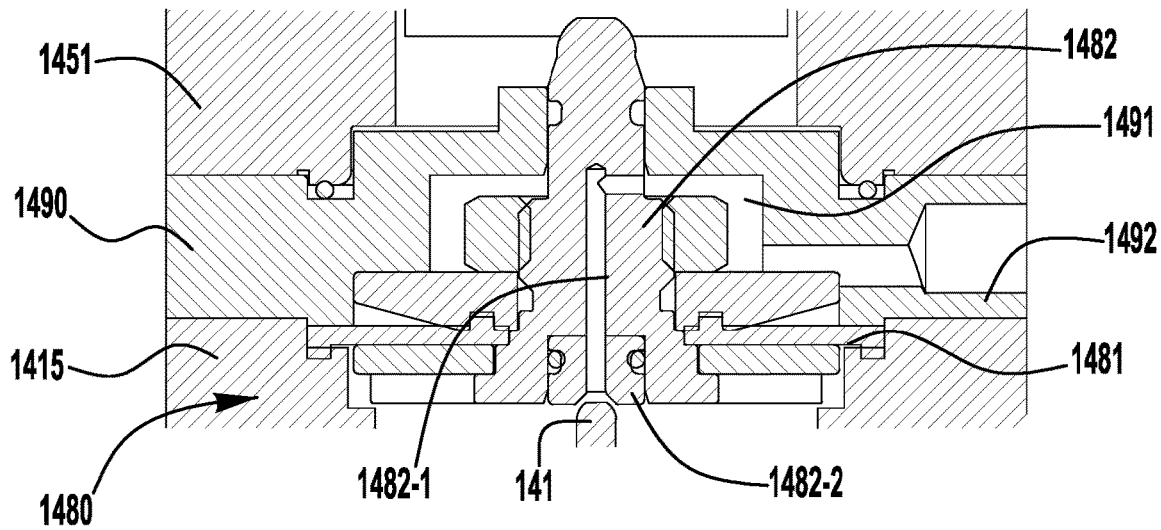
FIG. 16 is a cross-sectional view of a self-venting diaphragm sensing mechanism for a pressure regulator valve assembly, in accordance with another exemplary embodiment of the present disclosure.

In the illustrated embodiment of FIG. 16, a vented diaphragm sensing mechanism 1480 includes a flat, flexible disc of material (e.g., elastomer, plastic, or metal as suitable for the system fluid) forming a diaphragm 1481 having an outer periphery clamped or secured between opposed surfaces of the valve body housing block 1415 and a venting adapter block 1490 mounted between the valve body housing block and the load mechanism housing 1451 (e.g., spring housing or dome housing), for example, by a threaded screw arrangement. As shown, the vented diaphragm sensing mechanism 1480 may include a vented diaphragm screw 1482 installed through a central opening in the diaphragm 1481, which includes a vent passage 1482-1 extending from a lower end face of the diaphragm to a mid-portion of the diaphragm screw, in alignment with a cavity 1491 in the venting adapter block 1490, and in fluid communication with a vent port 1492 in the venting adapter block 1490. The vent port 1492 may be threaded for connection to a fluid line for containment and/or analysis of the vented fluid. The vented diaphragm screw 1482 may include a plastic (e.g., PEEK) relief seat 1482-2 to facilitate sealing engagement with the upper poppet stem 141 at pressures below the set point of the regulator.

Figure 17:
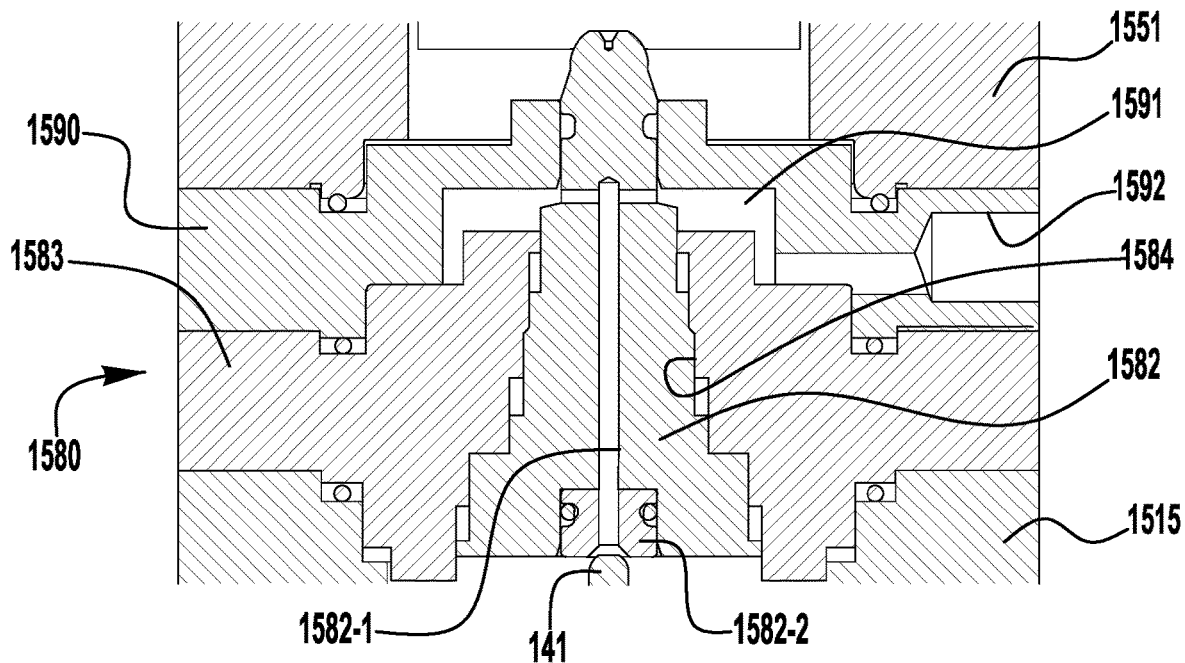
FIG. 17 is a cross-sectional view of a self-venting piston sensing mechanism for a pressure regulator valve assembly, in accordance with another exemplary embodiment of the present disclosure.

In the illustrated embodiment of FIG. 17, a vented piston sensing mechanism 1580 includes a piston member 1582 received in a central piston bore 1584 of a piston adapter block or plate 1583, with an upper portion of the piston member received through a central bore of a venting adapter block 1590. The piston adapter plate 1583 and the venting adapter block 1590 are secured together between the valve body housing block 1515 and the load mechanism housing 1551 (e.g., spring housing or dome housing), for example, by a threaded screw arrangement. As shown, the vented piston sensing mechanism 1580 may include a vented piston member 1582 installed having a vent passage 1582-1 extending from a lower end face of the piston member to a mid-portion of the piston member, in alignment with a cavity 1591 in the venting adapter block 1590, and in fluid communication with a vent port 1592 in the venting adapter block. The vent port 1592 may be threaded for connection to a fluid line for containment and/or analysis of the vented fluid. The vented diaphragm screw 1582 may include a plastic (e.g., PEEK) relief seat 1582-2 to facilitate sealing engagement with the upper poppet stem 141 at pressures below the set point of the regulator.

For many of the exemplary features and embodiments described herein, regulator components may be adapted for use in multiple regulator arrangements, for example, to reduce to number of components required to construct a variety of regulators. For example, as described herein, a modular regulator valve body housing may be configured for use in both pressure-reducing and back-pressure regulator assemblies (e.g., by installing a guide ring in the valve body cavity to support the upper poppet stem of the pressure-reducing regulator valve arrangement, and by selectively orienting the seat carrier to provide a downward facing seat seal for pressure-reducing regulator assemblies and an upward facing seat seal for back-pressure regulator assemblies). Additionally or alternatively, a modular regulator valve body housing may be configured for use with both diaphragm sensing and piston sensing arrangements (e.g., by assembling a piston adapter block or plate with the valve body housing to accommodate the piston sensing arrangement). Additionally or alternatively, a modular regulator valve body housing may be configured for use as both a non-venting and a self-venting assembly (e.g., by assembling a vent adapter block with the valve body housing, along with installation of a vented piston member/diaphragm screw, to provide self-venting functionality).

Figure 18:
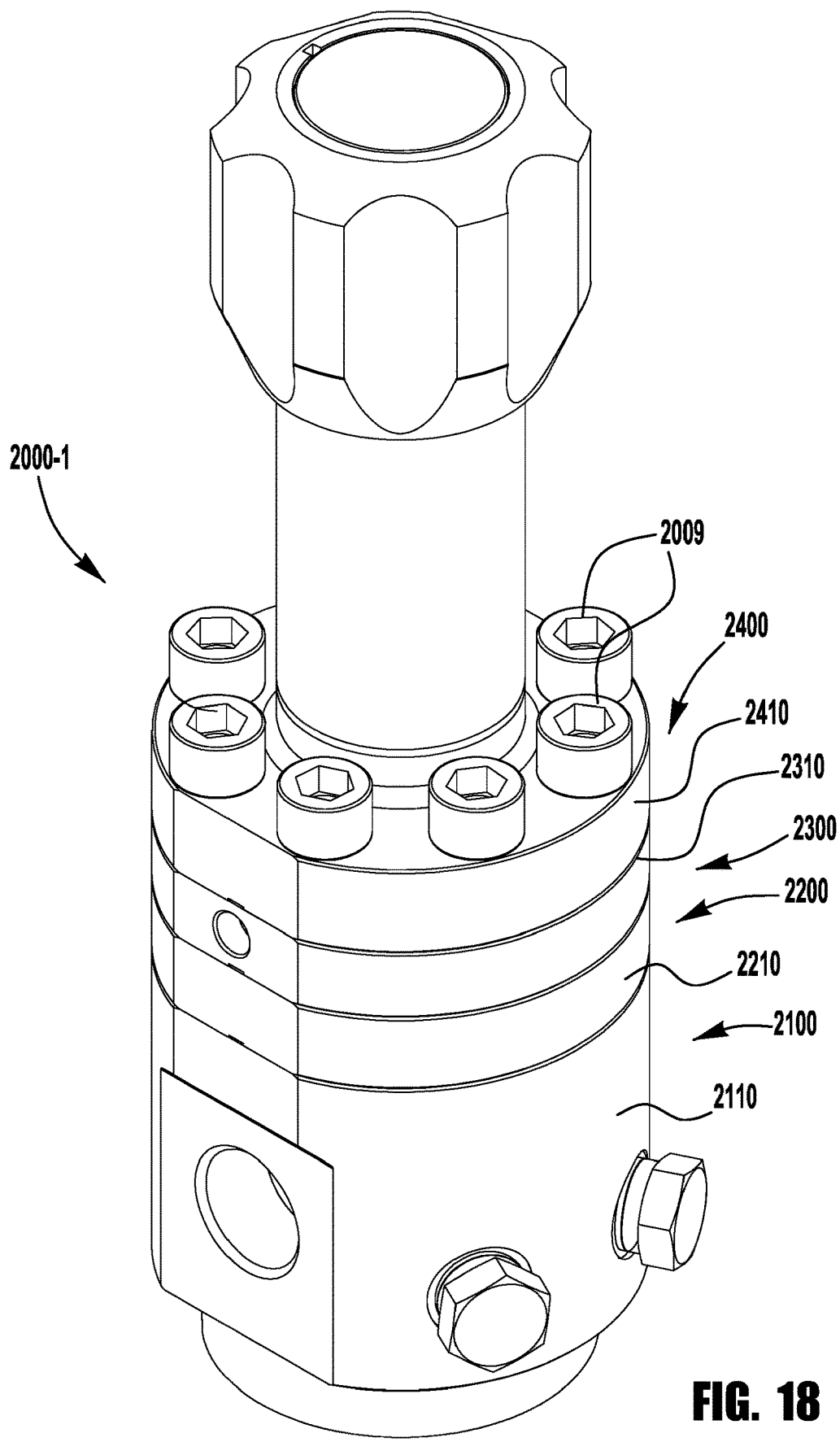
FIG. 18 is a perspective view of a modular piston-sensing, venting, spring loading pressure-reducing regulator assembly, according to an exemplary embodiment of the present disclosure.
Figure 19:
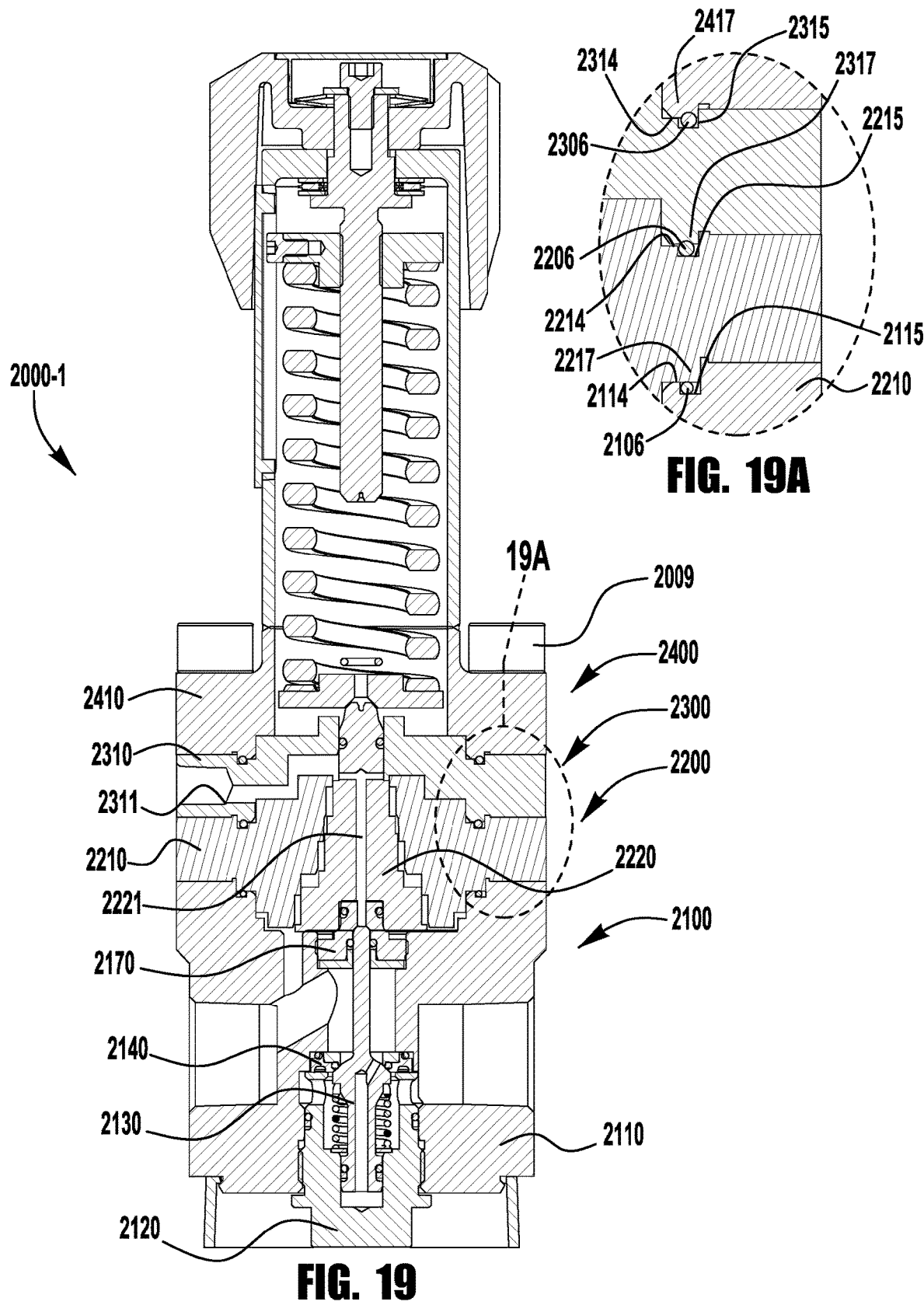
FIG. 19 is a cross-sectional view of the modular regulator assembly of FIG. 18.
Figure 20:
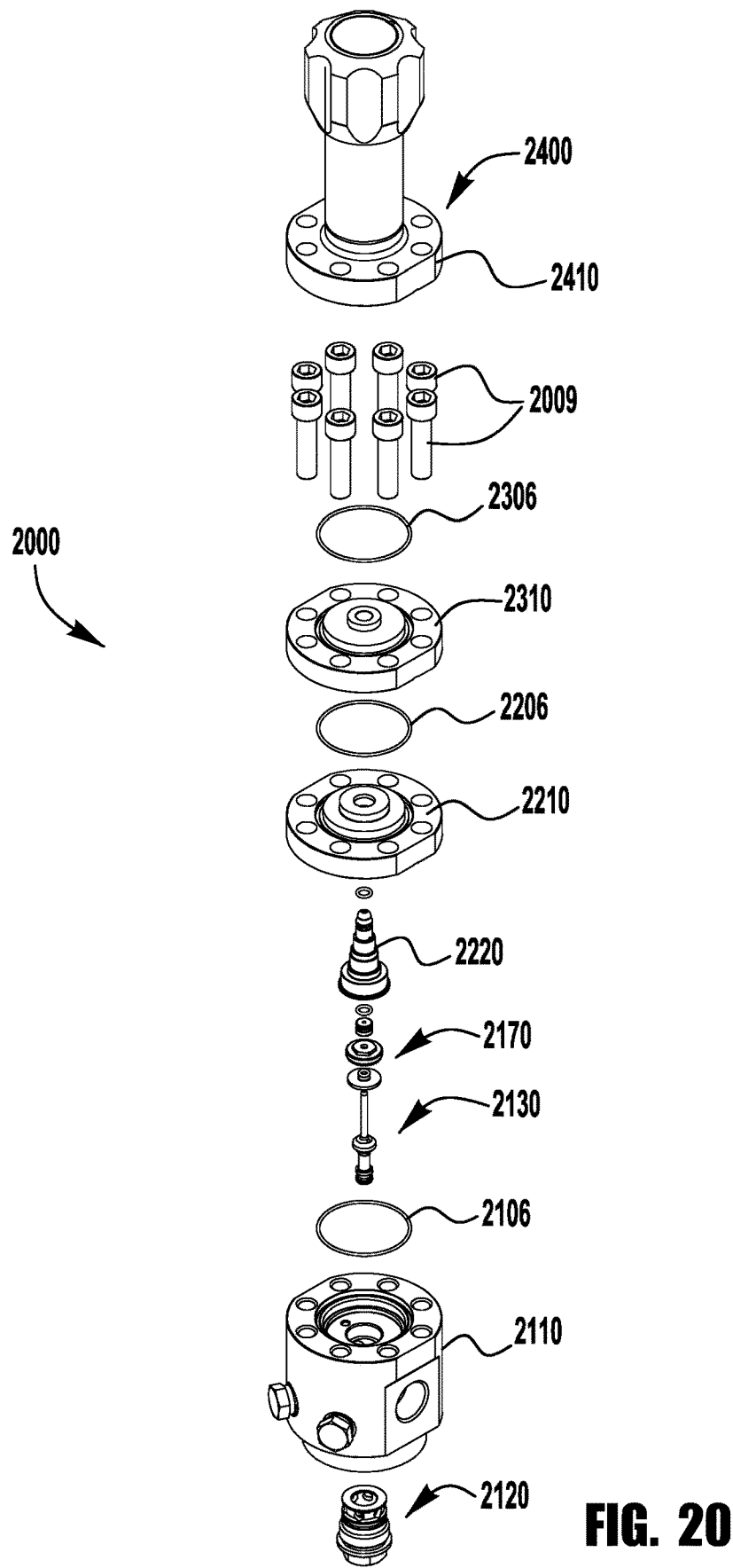
FIG. 20 is an exploded perspective view of the regulator assembly of FIG. 18.

FIGS. 18-20 illustrate an exemplary piston-sensing, self-venting, spring loading pressure-reducing regulator assembly 2000-1 including a valve body module 2100 having a valve body housing block 2110 and plug 2120 retaining or accommodating a pressure reducing poppet 2130 and seat 2140 arrangement, a piston module 2200 including a piston adapter block 2210 retaining or accommodating a piston sensing member 2220 in engagement with the poppet, a self-venting module 2300 including a venting adapter block 2310 defining a vent port 2311 in fluid communication with a vent passage 2221 in the piston sensing member, and a spring loading module 2400 including a loading block 2410 retaining a spring loading mechanism (e.g., the spring loading mechanism shown in FIG. 13 and described above). The modular assembly blocks 2100, 2200, 2300, 2400 are provided with aligned holes 2109, 2209, 2309, 2409 (e.g., spaced around an outer periphery, as shown) to receive elongated bolts 2009 securing the blocks together as an assembly.

Figure 21:
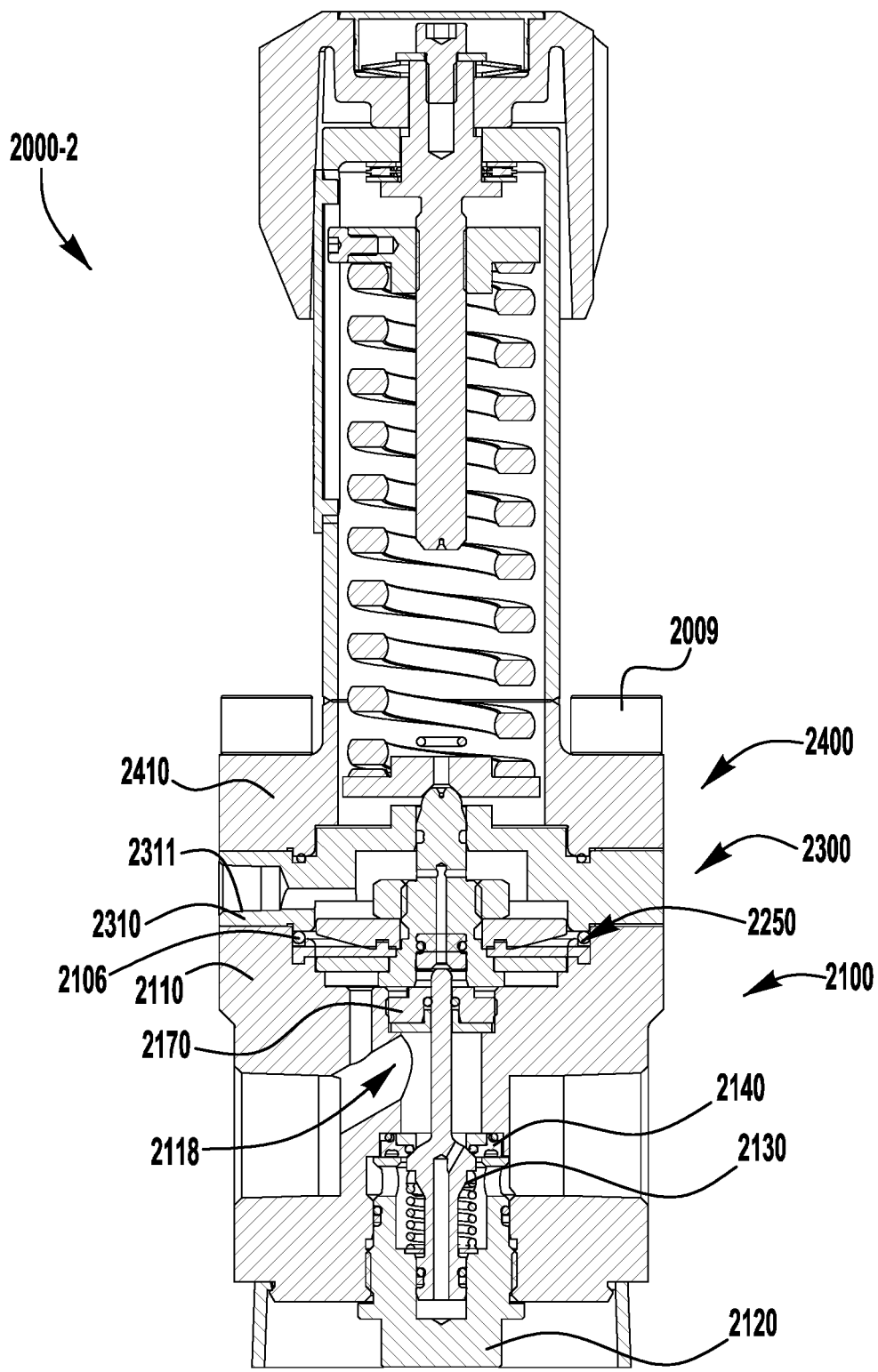
FIG. 21 is a cross-sectional view of a modular diaphragm-sensing, venting, spring loading pressure-reducing regulator assembly, according to an exemplary embodiment of the present disclosure.
Figure 22:
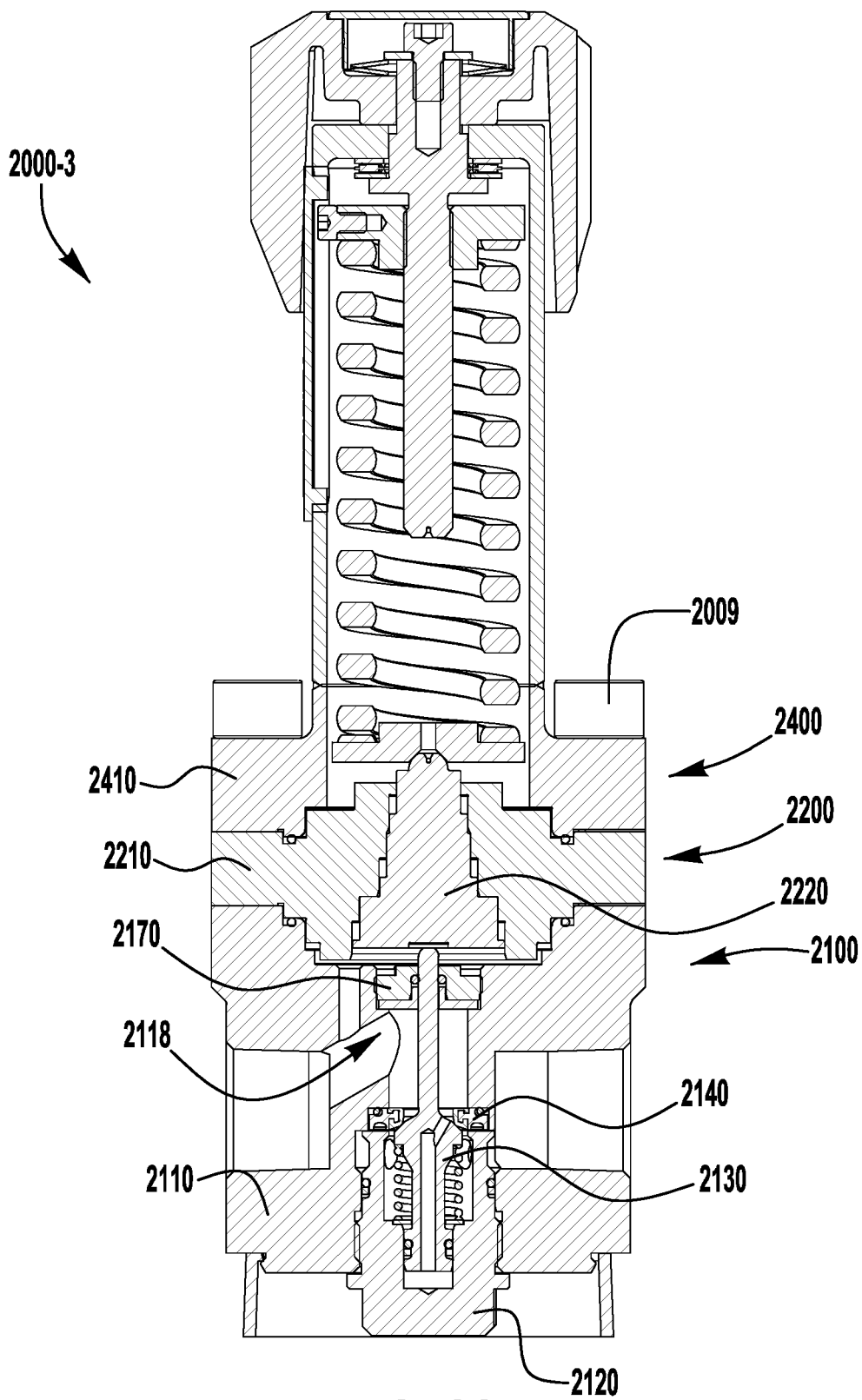
FIG. 22 is a cross-sectional view of a modular piston-sensing, non-venting, spring loading pressure-reducing regulator assembly, according to an exemplary embodiment of the present disclosure.
Figure 23:
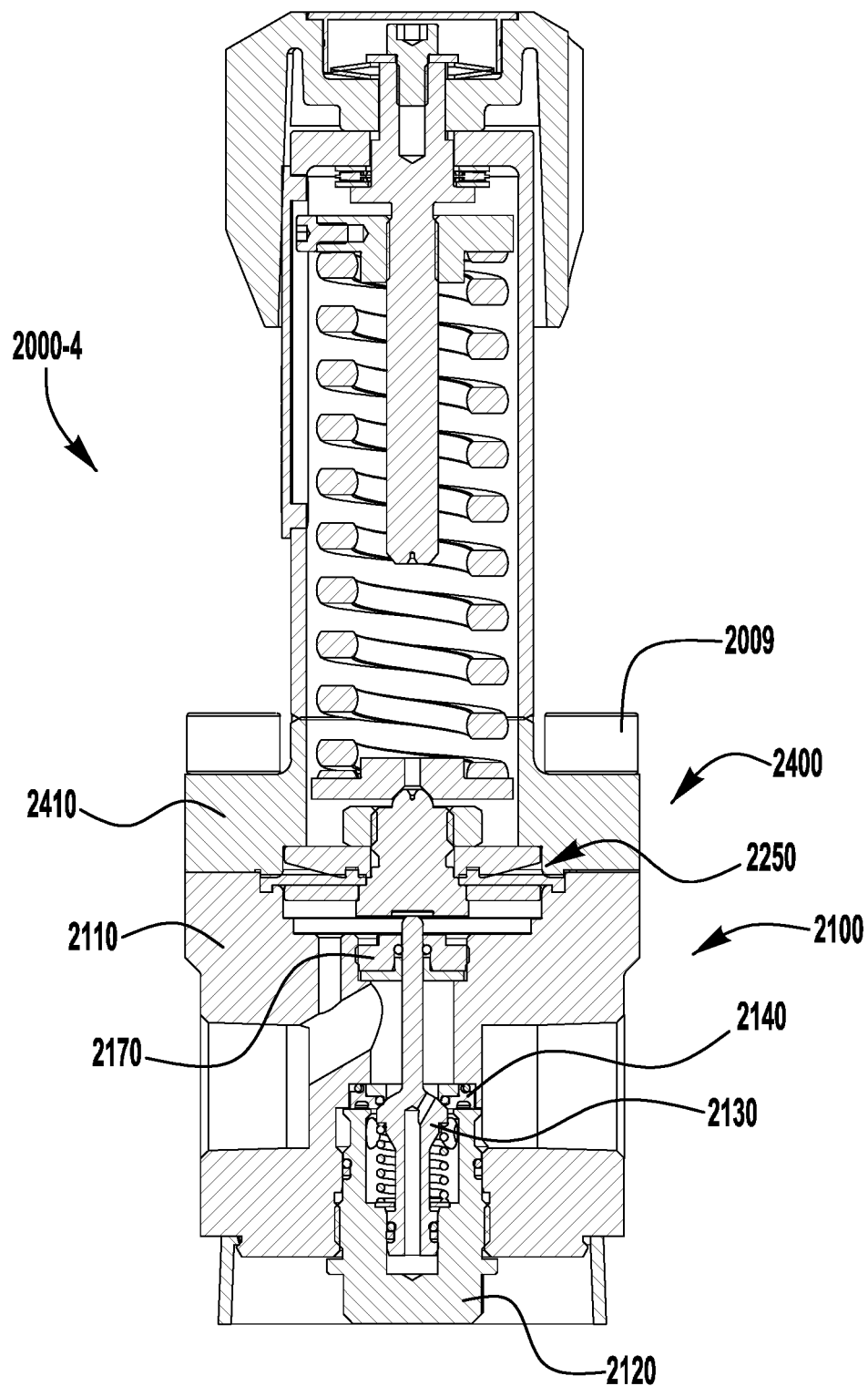
FIG. 23 is a cross-sectional view of a modular diaphragm-sensing, non-venting, spring loading pressure-reducing regulator assembly, according to an exemplary embodiment of the present disclosure.

To accommodate different modular arrangements in which one or both of the piston module 2200 and self-venting module are excluded, uniform mating/sealing arrangements may be provided between the stacked module blocks 2110, 2210, 2310, 2410, such that the regulator assembly may be converted to or otherwise provided as:

- a diaphragm sensing venting assembly 2000-2, by omitting the piston module 2200 and assembling the valve body housing block 2110 directly to the venting adapter block 2310 (with a diaphragm subassembly 2250 installed in the cavity defined between the valve body housing block and the venting adapter block), as shown in FIG. 21;
- a piston sensing non-venting assembly 2000-3, by omitting the venting module 2300 and assembling the piston adapter block 2210 directly to the loading block 2410, as shown in FIG. 22; or
- a diaphragm sensing non-venting assembly 2000-4, by omitting both the piston module 2200 and the venting module 2300 and assembling the valve body housing block 2110 directly to the loading block 2410 (with a diaphragm subassembly 2250 installed in the cavity defined between the valve body housing block and the venting adapter block), as shown in FIG. 23.

A variety of uniform first and second block assembly interfaces may be used for uniform mating and sealing engagement between the adjacent blocks. In an exemplary embodiment, as shown in FIG. 19, the valve body housing block 2110, the piston adapter block 2210, and the venting adapter block 2310 are each provided with a first assembly interface including a uniformly sized upper trepan seal groove 2115, 2215, 2315 recessed from an upper end face counterbore 2114 or groove 2214, 2314 to accommodate an annular gasket seal 2106, 2206, 2306. The piston adapter block 2210, the venting adapter block 2310, and the loading block 2410 each include a corresponding second assembly interface including a uniformly sized lower annular shoulder 2217 or rib 2317, 2417, received in the corresponding counterbore 2114 or groove 2214, 2314 to sealingly compress the annular gasket seal 2106, 2206, 2306.

As shown in FIGS. 21 and 23, the diaphragm sensing assemblies 2000-2, 2000-4 may include a diaphragm 2251 having an outer periphery (e.g., flange) 2256 that is compressed between the trepan seal groove and the boss/rib (e.g., in combination with or in place of the gasket seal 2106) to effect a seal between the valve body housing block 2110 and the diaphragm 2251, and between the valve body housing block and the adjacent venting adapter block (in FIG. 21) or loading block (in FIG. 23).

Additionally, alternate loading modules (e.g., a dome loading module as shown in FIG. 14, or a high sensitivity spring/dome loading module as shown in FIGS. 9, 10, and 15) may be provided with a similar lower annular boss or rib for assembly with the same valve body housing, piston adapter, and venting adapter blocks 2110, 2210, 2310.

Figure 24:
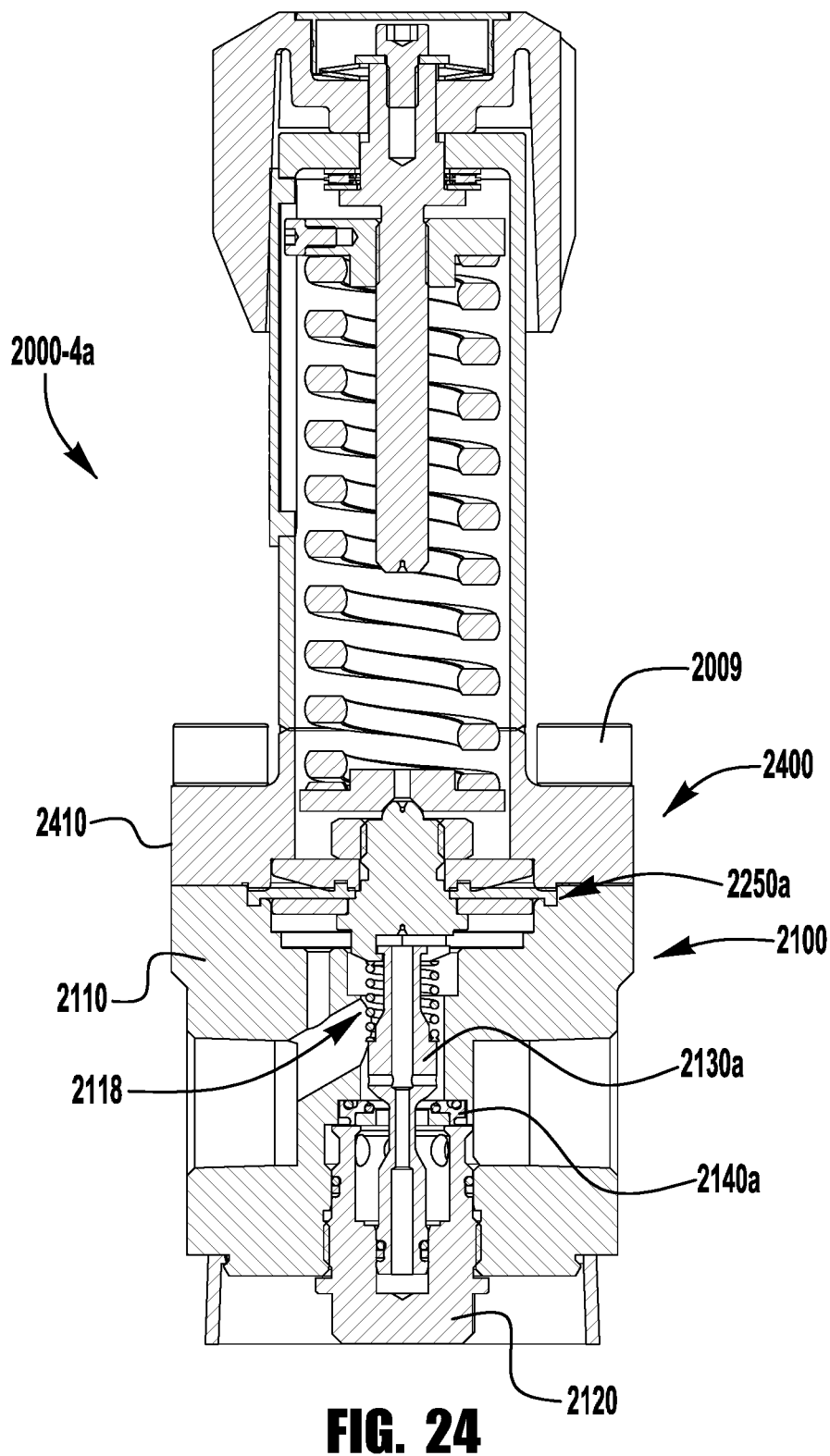
FIG. 24 is a cross-sectional view of a modular diaphragm-sensing, non-venting, spring loading backpressure regulator assembly, according to an exemplary embodiment of the present disclosure.

Referring to FIG. 23, the exemplary pressure reducing regulator valve body module 2100 includes a guide ring 2170 (e.g., similar to the guide ring 170 described above) installed in an enlarged upper recess 2118 of the valve body housing block 2110 to closely receive the upper poppet stem of the pressure reducing poppet 2130. As shown in FIG. 24, to convert or otherwise provide the regulator assembly as a back pressure regulator assembly 2000-4a, the guide ring 2170 may be removed so that the enlarged upper recess 2118 of the valve body housing block 2110 may accommodate the larger upper poppet stem of a back pressure poppet 2130a, installed in combination with a back pressure seat 2140a and diaphragm backpressure subassembly 2250a.

As shown, the module regulator assemblies of FIGS. 18-24 may include components and features more fully described in the above descriptions of the embodiments of FIGS. 3-17.

The inventive aspects have been described with reference to the exemplary embodiments. Modification and alterations will occur to others upon a reading and understanding of this specification. It is intended to include all such modifications and alterations insofar as they come within the scope of the appended claims or the equivalents thereof.

We claim:

1. A pressure regulator comprising:
   a valve body module including a valve body housing block retaining a poppet and a seat seal;
   a loading module including a loading block retaining a loading element configured to apply a load force to a sensing member disposed between the loading element and the poppet;
   a piston module including a piston adapter block secured to the valve body housing block and retaining the sensing member in engagement with the poppet, wherein the sensing member comprises a piston and the piston adapter block includes a piston bore retaining a stepped fluid driven portion of the piston; and
   a venting module including a venting adapter block secured between the piston adapter block and the loading block and defining a vent port in fluid communication with a vent passage in the sensing member;
   wherein the valve body housing block and the piston adapter block each include a uniformly sized first assembly interface, and the piston adapter block and the venting adapter block each include a uniformly sized second assembly interface in mating and sealing engagement with the first assembly interface of the adjacent one of the valve body housing block and the piston adapter block, such that the valve body housing block is configured for assembly directly to the venting adapter block after removing the piston module from between the valve body housing block and the venting adapter block.

2. The pressure regulator of claim 1, wherein the first assembly interface comprises a trepan seal groove recessed from an end face counterbore or groove and retaining an annular gasket seal, and the second assembly interface comprises an annular shoulder or rib received in the counterbore or groove of the mating first assembly interface to sealingly compress the annular gasket seal.

3. The pressure regulator of claim 1, wherein each of the valve body housing block, the loading block, the piston adapter block and the venting adapter block includes aligned holes receiving elongated bolts to secure the valve body housing block, the loading block, the piston adapter block and the venting adapter block together as a stacked assembly.

4. The pressure regulator of claim 1, wherein the piston block is configured for assembly directly to the loading block after removing the venting module from between the piston adapter block and the loading block.

5. The pressure regulator of claim 1, wherein the loading module comprises one of a dome loading module and a spring loading module.

6. The pressure regulator of claim 1, wherein the valve body housing block is configured for assembly directly to the loading block after removing both the piston module and the venting module from between the valve body housing block and the loading block.

7. The pressure regulator of claim 1, wherein the venting adapter block includes a first assembly interface uniformly sized with the first assembly interfaces of the valve body housing block and the piston adapter block, and the loading block includes a second assembly interface uniformly sized with the second assembly interfaces of the piston adapter block and the venting adapter block, the second assembly interface of the loading block being in mating and sealing engagement with the first assembly interface of the venting adapter block, such that the loading block is configured for assembly directly to the piston block after removing the venting module from between the piston adapter block and the loading block.

8. A pressure regulator comprising:
   a valve body module including a valve body housing block retaining a poppet and a seat seal;
   a loading module including a loading block retaining a loading element configured to apply a load force to a sensing member disposed between the loading element and the poppet;
   a piston module including a piston adapter block secured to the valve body housing block and retaining the sensing member in engagement with the poppet, wherein the sensing member comprises a piston and the piston adapter block includes a piston bore retaining a stepped fluid driven portion of the piston; and a venting module including a venting adapter block secured between the piston adapter block and the loading block and defining a vent port in fluid communication with a vent passage in the sensing member;
wherein the piston adapter block and the venting adapter block each include a uniformly sized first assembly interface, and the venting adapter block and the loading block each include a uniformly sized second assembly interface in mating and sealing engagement with the first assembly interface of the adjacent one of the piston adapter block and the venting adapter block, such that the piston adapter block is configured for assembly directly to the loading block after removing the venting module from between the piston adapter block and the loading block.

9. The pressure regulator of claim 8, wherein the first assembly interface comprises a trepan seal groove recessed from an end face counterbore or groove and retaining an annular gasket seal, and the second assembly interface comprises an annular shoulder or rib received in the counterbore or groove of the mating first assembly interface to sealingly compress the annular gasket seal.

10. The pressure regulator of claim 8, wherein each of the valve body housing block, the loading block, the piston adapter block and the venting adapter block includes aligned holes receiving elongated bolts to secure the valve body housing block, the loading block, the piston adapter block and the venting adapter block together as a stacked assembly.

11. The pressure regulator of claim 8, wherein the valve body housing block is configured for assembly directly to the venting block after removing the piston module from between the valve body housing block and the venting block.

12. The pressure regulator of claim 8, wherein the loading module comprises one of a dome loading module and a spring loading module.

13. The pressure regulator of claim 8, wherein the valve body housing block is configured for assembly directly to the loading block after removing both the piston module and the venting module from between the valve body housing block and the loading block.

* * * * *